(12) United States Patent
Akagi

(10) Patent No.: US 8,542,201 B2
(45) Date of Patent: Sep. 24, 2013

(54) INPUTTING APPARATUS

(75) Inventor: Koji Akagi, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 944 days.

(21) Appl. No.: 12/646,860

(22) Filed: Dec. 23, 2009

(65) Prior Publication Data

US 2010/0164892 A1    Jul. 1, 2010

(30) Foreign Application Priority Data

Dec. 26, 2008    (JP) ................................. 2008-333160

(51) Int. Cl.
*G06F 3/041*    (2006.01)

(52) U.S. Cl.
USPC ........................................................ 345/173

(58) Field of Classification Search
USPC .................. 345/173, 174, 175; 715/747, 762
See application file for complete search history.

(56) References Cited

U.S. PATENT DOCUMENTS

2006/0066587 A1 * 3/2006 Morohoshi et al. ........... 345/173
2007/0236468 A1 * 10/2007 Tuli .............................. 345/173

FOREIGN PATENT DOCUMENTS

JP        2006-092321 A    4/2006

* cited by examiner

*Primary Examiner* — Joseph Feild
*Assistant Examiner* — Andrew Sasinowski
(74) *Attorney, Agent, or Firm* — Baker Botts L.L.P.

(57) ABSTRACT

An inputting apparatus including: a detecting portion which detects a movement of an input object; a first judging section which judges that the movement of the detected input object is a first-directional movement in which the input object is moved in a first direction, and that the movement of the input object is a second-directional movement in which the input object is moved in the first direction after being moved in a second direction; a first performing section which performs a processing according to the movement in the first direction where the movement of the input object is the first-directional movement; and a second performing section which regards the movement in the first direction in the second-directional movement as the movement in the second direction and performs a processing according to the movement in the second direction, where the movement of the input object is the second-directional movement.

16 Claims, 11 Drawing Sheets

ORDER OF SENSORS HAVING
DETECTED TOUCH OF FINGER
SENSOR 3→SENSOR 2→SENSOR 4→
SENSOR 5→SENSOR 6

EXAMPLE OF CURSOR
MOVED IN ACCORDANCE
WITH CHANGE OF TOUCH
POSITION OF FINGER

ORDER OF SENSORS HAVING
DETECTED TOUCH OF FINGER
SENSOR 6→SENSOR 5→SENSOR 4

EXAMPLE OF CURSOR
MOVED IN ACCORDANCE
WITH CHANGE OF TOUCH
POSITION OF FINGER

ORDER OF SENSORS HAVING
DETECTED TOUCH OF FINGER
SENSOR 1→SENSOR 2→SENSOR 4→
SENSOR 5→SENSOR 6

EXAMPLE OF CURSOR MOVED
IN ACCORDANCE WITH CHANGE
OF TOUCH POSITION OF FINGER

ORDER OF SENSORS HAVING
DETECTED TOUCH OF FINGER
SENSOR 2→SENSOR 4→SENSOR 5→
SENSOR 6→SENSOR 7

EXAMPLE OF CURSOR MOVED
IN ACCORDANCE WITH CHANGE
OF TOUCH POSITION OF FINGER

ORDER OF SENSORS HAVING
DETECTED TOUCH OF FINGER
SENSOR 0→SENSOR 5→SENSOR 6→SENSOR 7

EXAMPLE OF CURSOR MOVED IN
ACCORDANCE WITH CHANGE OF
TOUCH POSITION OF FINGER

ORDER OF SENSORS HAVING
DETECTED TOUCH OF FINGER
SENSOR 0→SENSOR 4→SENSOR 3→SENSOR 2

EXAMPLE OF CURSOR MOVED IN
ACCORDANCE WITH CHANGE OF
TOUCH POSITION OF FINGER

ORDER OF SENSORS HAVING
DETECTED TOUCH OF FINGER
SENSOR 1→SENSOR 2→SENSOR 3→
SENSOR 4→SENSOR 5

EXAMPLE OF CURSOR MOVED IN
ACCORDANCE WITH CHANGE OF
TOUCH POSITION OF FINGER

ORDER OF SENSORS HAVING
DETECTED TOUCH OF FINGER
SENSOR 8→SENSOR 7→SENSOR 6→
SENSOR 5→SENSOR 4

EXAMPLE OF CURSOR MOVED IN
ACCORDANCE WITH CHANGE OF
TOUCH POSITION OF FINGER

ORDER OF SENSORS HAVING
DETECTED TOUCH OF FINGER
SENSOR 0→SENSOR 1→SENSOR 2→SENSOR 3

EXAMPLE OF CURSOR MOVED IN
ACCORDANCE WITH CHANGE OF
TOUCH POSITION OF FINGER

ORDER OF SENSORS HAVING
DETECTED TOUCH OF FINGER
SENSOR 8→SENSOR 7→SENSOR 6→SENSOR 5

EXAMPLE OF CURSOR MOVED IN
ACCORDANCE WITH CHANGE OF
TOUCH POSITION OF FINGER

INPUTTING APPARATUS

CROSS REFERENCE TO RELATED APPLICATION

The present application claims priority from Japanese Patent Application No. 2008-333160, which was filed on Dec. 26, 2008, the disclosure of which is herein incorporated by reference in its entirety.

BACKGROUND OF THE INVENTION

1. Field of the Invention

The present invention relates to an inputting apparatus.

2. Description of the Related Art

There is known a touchpad apparatus provided with (a) a touchpad including a cross-shaped operational face on a front surface of a casing of a main body, (b) a touchpad including an L-shaped operational face, or (c) a touchpad having a T-shaped operational face and configured such that, where a two-dimensional cursor-commanding operation in upward, downward, rightward, and leftward directions is performed on an operational screen of a display panel, a user can instinctively perform the two-dimensional cursor-commanding operation.

SUMMARY OF THE INVENTION

However, in the above-described touchpad apparatus, since the two-dimensional cursor-commanding operation in an upward and downward direction is performed with a portion of each of the cross-shaped, L-shaped, and T-shaped touchpads which extends upward and downward, and the two-dimensional cursor-commanding operation in a rightward and leftward direction is performed with a portion of each of the cross-shaped, L-shaped, and T-shaped touchpads which extends rightward and leftward, it is required that each of a length of the portion of each touchpad which extends upward and downward and a length of the portion of each touchpad which extends rightward and leftward is larger than a certain length in order that the user instinctively performs the inputting operation in the upward, downward, rightward, and leftward directions. This causes a problem that each touchpad as a detecting area is upsized in the upward, downward, rightward, and leftward directions.

This invention has been developed in view of the above-described situations, and it is an object of the present invention to provide an inputting apparatus in which the user can instinctively input movements in a first direction and a second direction intersecting the first direction via a detecting area.

In order to achieve the above-described object, a first aspect in accordance with the present invention provides an inputting apparatus comprising: a detecting portion configured to detect a movement of an input object relative to a detecting area; a first judging section configured to judge that the movement of the input object which is detected by the detecting portion is a first-directional movement in which the input object is moved from a detecting start point in a first direction, and that the movement of the input object is a second-directional movement in which the input object is moved in the first direction after being moved in a second direction intersecting the first direction; a first performing section configured to perform a processing according to the movement in the first direction where the first judging section has judged that the movement of the input object is the first-directional movement; and a second performing section configured to regard the movement in the first direction in the second-directional movement as the movement in the second direction and to perform a processing according to the movement in the second direction, where the first judging section has judged that the movement of the input object is the second-directional movement.

According to the construction as described above, a user can instinctively perform an inputting operation for movements in the first direction and the second direction with the detecting area. It is noted that the movement of the second-directional movement in the second direction is not for inputting a moving distance in the second direction but for regarding the movement in the first direction as the movement in the second direction. Thus, the detecting area for detecting the movement of the second-directional movement in the second direction only needs to be a size in which the detecting area can detect the movement in the second direction, and a moving amount in the second direction can be inputted as a moving amount in the first direction. Thus, upsizing of the detecting area in the second direction can be restrained.

In order to achieve the above-described object, a second aspect in accordance with the present invention provides an inputting apparatus comprising: a detecting portion configured to detect a movement of an input object relative to a detecting area having a generally rectangular shape, with a first direction being as a longitudinal direction of the detecting area; a first judging section configured to judge, where the detecting portion has detected the movement of the input object from a detecting start point in the first direction, whether the detecting start point is located in a setting area which is preset in the detecting area or not; a first performing section configured to perform a processing according to a movement of the input object in the first direction where the first judging section has judged that the detecting start point is not located in the setting area; and a second performing section configured to perform a processing according to a movement of the input object in a second direction intersecting the first direction by regarding the movement of the input object from the detecting start point in the first direction as the movement in the second direction, where the first judging section has judged that the detecting start point is located in the setting area.

According to the construction as described above, the user can instinctively perform an inputting operation with the detecting area in the first direction and in the second direction without upsizing the detecting area in the second direction.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which.

DESCRIPTION OF THE EMBODIMENTS

Hereinafter, there will be described embodiments of the present invention by reference to the drawings. There will be explained, respectively referring to FIGS. 1, 2, 3-4, and 5-7, an external structure of a multi-function peripheral (MFP) 1 as an example of an inputting apparatus of the present invention, a hardware configuration of the inputting apparatus, an example of an operational method of the inputting apparatus, and a display updating processing of the inputting apparatus.

On an upper front portion of the MFP 1 as the present embodiment, there are provided an LCD (a part of a displaying portion) 16, a touch panel 17, and operational keys 15 which will be described below. A user can perform various settings and various controls of the MFP 1 by performing an inputting operation with the operational keys 15 or the touch panel 17.

In this MFP 1, an upsizing of a detecting area of the touch panel 17 in the vertical direction can be restrained. Further, a user can instinctively input movement in a lateral direction (i.e., a rightward and leftward direction) and a vertical direction (i.e., an upward and downward direction) with the detecting area.

Figure 2:
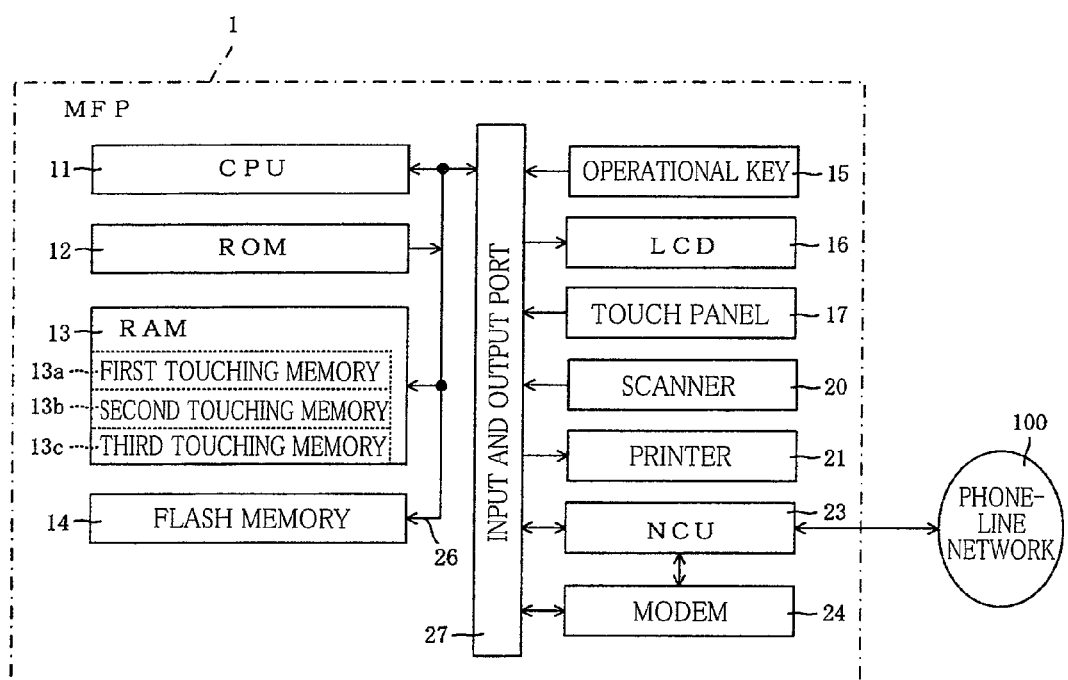
FIG. 2 is a block diagram showing an electric construction of the MFP as the first embodiment.

The MFP 1 is configured to perform facsimile communication with an external device, not shown, connected via a phone-line network 100 (with reference to FIG. 2). Further, this MFP 1 has various functions such as a printer function, a scanner function, and a copying function.

On an upper front portion of the MFP 1, there is provided an operational panel 6 having an elongated shape. This operational panel 6 is for operating a printer 21, a scanner 20, and so on and is mainly provided with the operational keys 15, the LCD 16, and the touch panel 17. The user can set and control the various functions by operating various buttons of the operational keys 15 or by operating the touch panel 17.

On the LCD 16, there are displayed, e.g., a menu, an operational procedure, and a state of a procedure being performed. On a right portion of the LCD 16, there is provided the touch panel 17 as one type of the inputting apparatus.

Figure 1A:
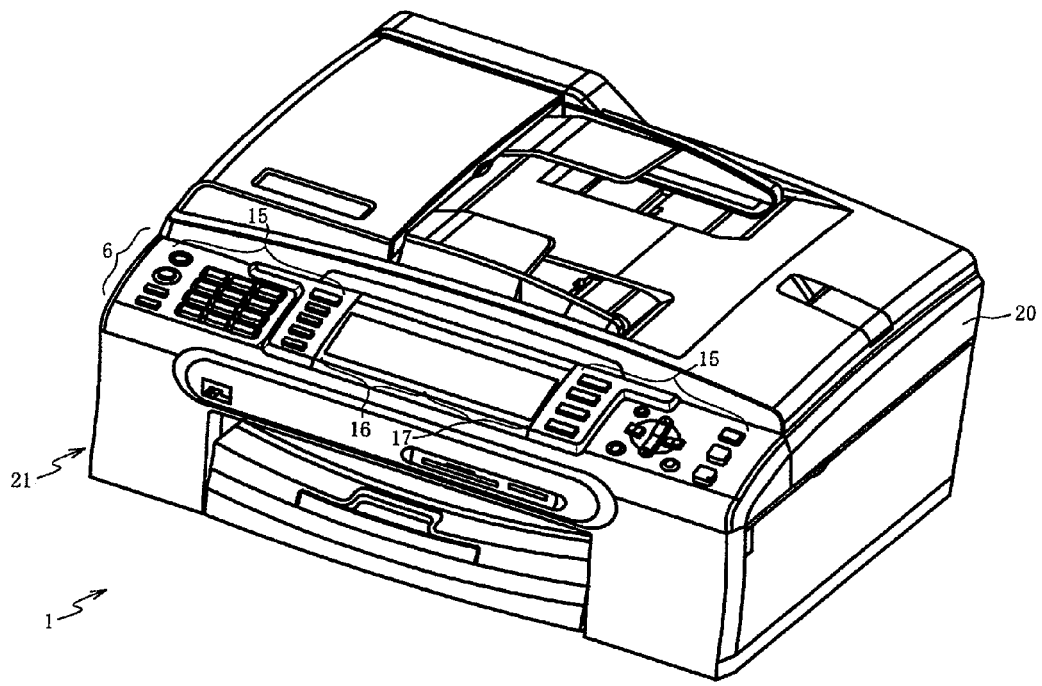
FIG. 1A is a perspective view showing an external structure of an MFP as an example of an inputting apparatus as a first embodiment of the present invention.
Figure 1B:
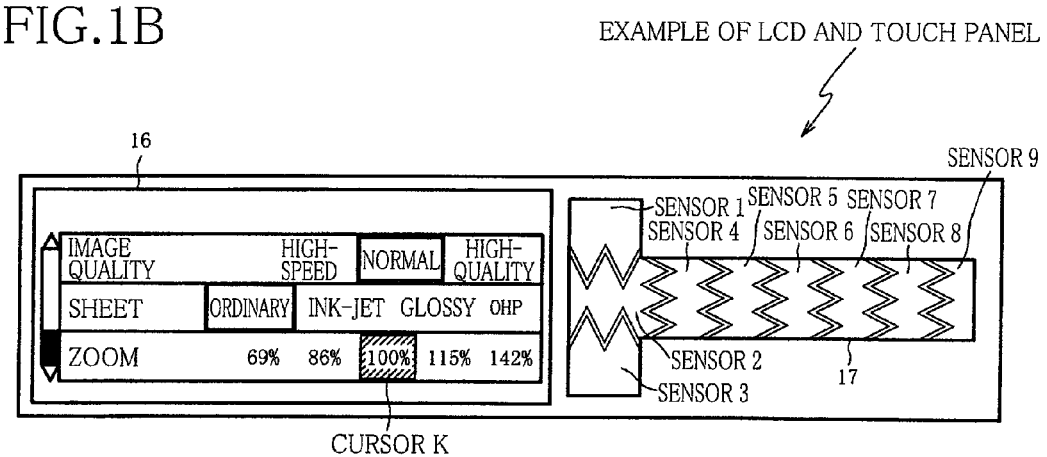
FIG. 1B is a conceptual view showing an example of display of a menu display relating to a copying function which is displayed on an LCD, and a structure of a touch panel.

Here, there will be explained an example of display of the LCD 16, and a structure of the touch panel 17 with reference to FIG. 1B. Initially, the display of the LCD 16 will be explained. As shown in FIG. 1B, on the LCD 16 are displayed a plurality of setting items in menu display relating to the copying function, for example. Specifically, as the setting items the user can set, there are displayed "IMAGE QUALITY", "SHEET", and "ZOOM" in order from an upper side of the LCD 16 to a lower side thereof.

The user can select a desired item for each of the various setting items by operating the operational keys 15 and the touch panel 17. It is noted that, an operational method of the touch panel 17 will be described below (with reference to FIGS. 3A, 3B, 4A and 4B).

On the menu display of the LCD 16, one of the setting items (i.e., setting contents) which has been selected is enclosed with a boldface frame for each of the setting items ("IMAGE QUALITY", "SHEET", and "ZOOM"). That is, "NORMAL" is selected in a setting of "IMAGE QUALITY", and "ORDINARY" is selected in a setting of "SHEET".

Further, on the menu display of the LCD 16, one of items of each setting item which is being set is enclosed with a cursor K (an item specifying portion) formed by a boldface frame in a state in which an inside of the item is hatched. That is, in FIG. 1B, the setting of "ZOOM" is currently performed, and "100%" is temporarily being selected. In view of the above, the cursor K (the item specifying portion) displays a specified item of the plurality of the items in a manner different from a manner in which the other items of the plurality of the items are displayed.

There will be next explained the structure of the touch panel 17. As shown in FIG. 1B, the touch panel 17 of the MFP 1 as the present embodiment has a rectangular shape in which the rightward and leftward direction is a longitudinal direction of the touch panel 17. On respective left end portions of a pair of longitudinal edges of the touch panel 17 which extend in the rightward and leftward direction, the touch panel 17 includes areas respectively projecting upward from an upper longitudinal edge of the pair of longitudinal edges and projecting downward from a lower longitudinal edge of the pair of longitudinal edges. As a result, the touch panel 17 has a transversely-lied T-shape in which a character "T" is rotated leftward by 90 degrees. Further, a width of the touch panel 17 in the upward and downward direction between the areas respectively projecting upward from the upper longitudinal edge and projecting downward from the lower longitudinal edge is smaller than a width of the touch panel 17 in the longitudinal direction thereof. Since the touch panel 17 is constructed in this shape, a required space of the touch panel 17 can be smaller than where the touch panel 17 is constructed in a generally square shape, for example.

This touch panel 17 is separated into nine areas in each of which whether a finger (i.e., an inputting medium) is being touched or not is detected. It is noted that each of the areas will be referred to as the "detecting area".

Specifically, as shown in FIG. 1B, on a left (one) end of the touch panel 17 are provided three detecting areas so as to be adjacent to each other in the vertical direction. It is noted that these detecting areas will be respectively referred to as a "sensor 1", a "sensor 2", and a "sensor 3" in order from the upper side to the lower side. Further, the area of the touch panel 17 which projects upward from the upper longitudinal edge is an area of the sensor 1 while the area of the touch panel 17 which projects downward from the lower longitudinal edge is an area of the sensor 3.

Further, six detecting areas are provided in a rightward direction from a right end of the sensor 2 so as to be adjacent to each other. It is noted that these six detecting areas will be respectively referred to as a "sensor 4", a "sensor 5", a "sensor 6", a "sensor 7", a "sensor 8", and a "sensor 9" in order from the left side to the right side. It is noted that each of the sensors 2 and 4-9 functions as a first detecting area formed to have a generally rectangular shape, with a first direction being as a longitudinal direction of the first detecting area, while each of the sensors 1 and 3 functions as a second detecting area formed to extend from a part of a longitudinal edge of the first detecting area by a distance shorter than a length of the first detecting areas in the longitudinal direction thereof.

It is noted that, although not shown in any figure, this touch panel 17 is constructed integrally with a controller (a part of a detecting portion), not shown, for controlling the touch panel 17, and where the user's finger has touched any of the sensors 1-9, one or ones of the sensors 1-9 which the touch of the finger is detected is specified by the controller. In accordance with one of ones of the sensors 1-9, which has or have been detected by the controller of the touch panel 17, a CPU 11 (with reference to FIG. 2) performs processings such as a processing in which the cursor K displayed on the LCD 16 is moved.

Further, in the touch panel 17 of the MFP 1 as the present embodiment, a boundary between one of the sensors (a part of the detecting areas) and another of the sensors (a part of the detecting areas) adjacent thereto has a generally sawtooth shape with a constant width. As a result, where the user has touched the boundary between one sensor and another sensor adjacent thereto, the user's finger has touched the two areas generally equally, and thus the controller can detect a movement of the user's finger more minutely. That is, in addition to a movement of the user's finger to each of the sensors 1-9, the controller can detect that the user's finger is being moved to the next one of the sensors 1-9.

There will be next explained an electric construction of the MFP 1 with reference to FIG. 2. The MFP 1 mainly includes the CPU 11, a ROM 12, a RAM 13, a flash memory 14, the operational keys 15, the LCD 16, the touch panel 17, a scanner 20, a printer 21, an NCU 23, and a modem 24.

The CPU 11, the ROM 12, the RAM 13, and the flash memory 14 are connected to each other via a bus line 26. Further, the operational keys 15, the LCD 16, the touch panel 17, the scanner 20, the printer 21, the NCU 23, the modem 24, and the bus line 26 are connected to each other via an input and output port 27.

The CPU 11 is configured to control the various functions of the MFP 1 and to control various portions of the MFP 1 which are connected to the input and output port 27, in accordance with fixed values and programs stored in the ROM 12, the RAM 13, and the flash memory 14, or in accordance with various signals transmitted and received via the NCU 23.

The ROM 12 is an unrewritable memory which stores, e.g., control programs performed in the MFP 1. The ROM 12 stores programs for executing or performing the display updating processing indicated by a flow-chart shown in FIG. 5, a touching-order obtaining processing indicated by a flow-chart shown in FIG. 6, a downward-direction scrolling processing indicated by a flow-chart shown in FIG. 7A, an upward-direction scrolling processing indicated by a flow-chart shown in FIG. 7B, and a rightward-and-leftward-direction scrolling processing indicated by a flow-chart shown in FIG. 7C, which processings will be described below.

The RAM 13 is a rewritable volatile memory for temporarily storing various data when various operations of the MFP 1 are performed. The RAM 13 includes a first touching memory 13a, a second touching memory 13b, and a third touching memory 13c.

The flash memory 14 is a rewritable nonvolatile memory. Data stored in this flash memory 14 is kept also after the MFP 1 is turned off.

Figure 3A:
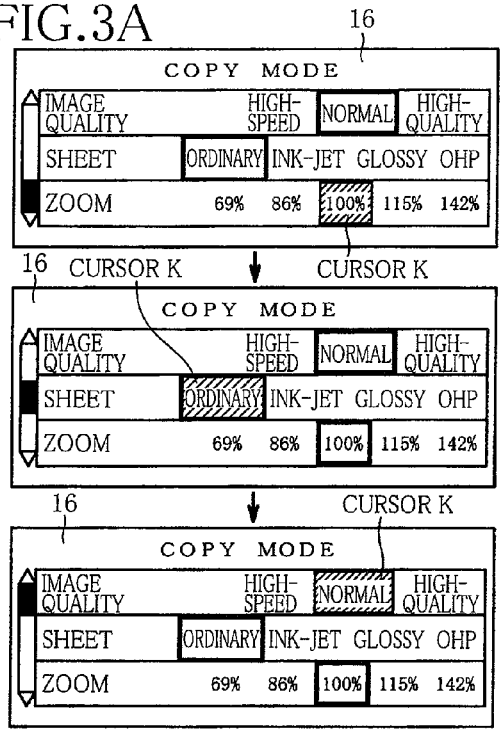
FIGS. 3A and 3B are schematic views each for explaining an example of an operational method of the touch panel.
Figure 3A:
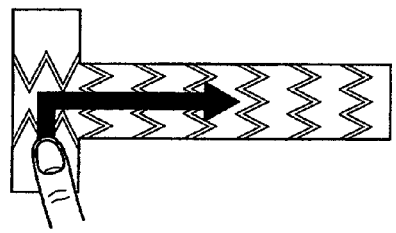
Figure 3B:
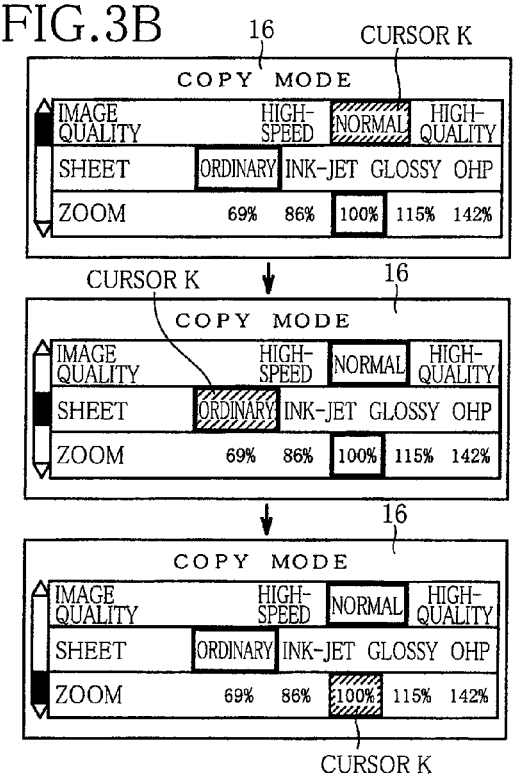
Figure 3B:
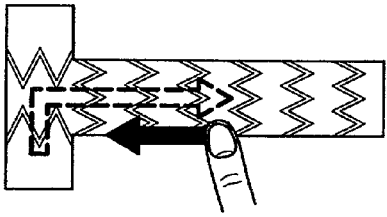

There will be next explained an example of the operational method of the touch panel 17 with reference to FIGS. 3A, 3B, 4A, and 4B. Initially, there will be explained an example of the operational method of the touch panel 17 in the case where a position of the display of the cursor K (i.e., a display position of the cursor K) is moved upward on a screen of the touch panel 17. Here, as shown in the menu display of the uppermost one of left figures of FIG. 3A, "100%" is selected in the setting of "ZOOM". It is noted that the uppermost LCD 16 in FIG. 3A shows the case in which the user's finger is touching the sensor 2, 3, or 4, a middle LCD 16 in FIG. 3A shows the case in which the user's finger is touching the sensor 5, and the lowermost LCD 16 shows the case in which the user's finger is touching the sensor 6. Further, the uppermost LCD 16 in FIG. 3B is the case in which the user's finger is touching the sensor 6, a middle LCD 16 in FIG. 3B shows the case in which the user's finger is touching the sensor 5, and the lowermost LCD 16 in FIG. 3B shows the case in which the user's finger is touching the sensor 4.

As shown in a right figure of FIG. 3A, the user's finger initially touches the sensor 3, moves upward to touch the sensor 2, and then moves rightward to touch the sensor 4. That is, in this case, the sensor 3 functions as a detecting start point at which the detection is started. Then, where the user's finger is moved rightward to another sensor, the cursor K is moved upward in the menu display (i.e., the cursor K is moved from the lowermost LCD 16 to the medium LCD 16 and then the uppermost LCD 16 in the left figures of FIG. 3A). Then, as shown in the right figure of FIG. 3B, where the user's finger is moved leftward to another sensor, the cursor K is moved downward in the menu display (i.e., the cursor K is moved from the uppermost LCD 16 to the medium LCD 16 and then the lowermost LCD 16 in the left figures of FIG. 3B). That is, the cursor K is moved in an upward and downward direction in the screen.

That is, where the user wants to move the cursor K upward in the screen, the user may initially input a direction of the movement of the cursor K (i.e., the upward direction in this case), and continuously input an amount of the movement of the cursor K (i.e., a moving amount of the cursor K). Thus, the user can instinctively perform the input operation. Further, only the sensor 3 needs to be provided in the vertical direction with respect to the lateral direction in which the sensors 2, 4, 5, 6, 7, 8, and 9 shown in FIG. 1B extend. Thus, it is possible to restrain the upsizing of the detecting area in the vertical direction.

Further, where the user wants to move (return) downward the cursor K which has been moved upward in the screen, the user only needs to reverse or invert a direction of a movement of the finger (i.e., a moving direction of the finger). Thus, it is possible to restrain the upsizing of the detecting area in the vertical direction, and the user can instinctively perform the input operation.

Figure 4A:
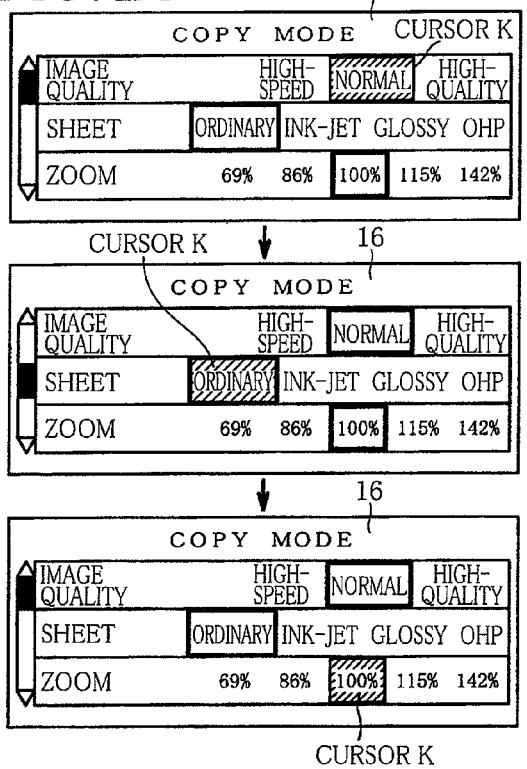
FIGS. 4A and 4B are schematic views each for explaining an example of the operational method of the touch panel.
Figure 4A:
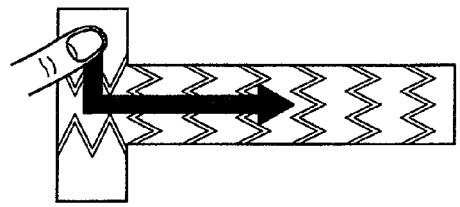

There will be next explained, with reference to FIG. 4A, an example of the operational method of the touch panel 17 in the case in which the display position of the cursor K is moved downward in the screen. It is noted that the uppermost LCD 16 in FIG. 4A shows the case in which the user's finger is touching the sensor 1, 2, or 4, a middle LCD 16 in FIG. 4A shows the case in which the user's finger is touching the sensor 5, and the lowermost LCD 16 shows the case in which the user's finger is touching the sensor 6. Further, the uppermost LCD 16 in FIG. 4B is the case in which the user's finger is touching the sensor 2, 4, or 5, a middle LCD 16 in FIG. 4B shows the case in which the user's finger is touching the sensor 6, and the lowermost LCD 16 in FIG. 4B shows the case in which the user's finger is touching the sensor 7.

As shown in a menu display shown in the upper LCD 16 in the left figures of FIG. 4A, "NORMAL" is selected by the cursor K in the setting of "IMAGE QUALITY". In this state, as shown in the right figure of FIG. 4A, the user's finger initially touches the sensor 1, moves downward to touch the sensor 2, and then moves rightward to touch the sensor 4.

Then, where the user's finger is moved rightward to another sensor, the cursor K is moved downward in the menu display (i.e., the cursor K is moved from the uppermost LCD 16 to the medium LCD 16 and then the lowermost LCD 16 in the left figures of FIG. 4A). Then, where the user's finger is moved leftward to another sensor, the cursor K is moved upward in the menu display (i.e., the cursor K is moved from the lowermost LCD 16 to the medium LCD 16 and then the uppermost LCD 16 in the left figures of FIG. 4A. That is, the cursor K is moved in the upward and downward direction in the screen.

Figure 4B:
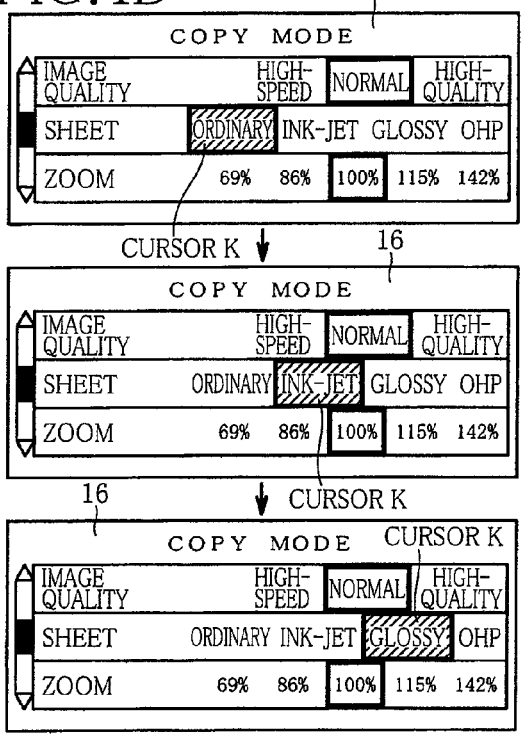
Figure 4B:
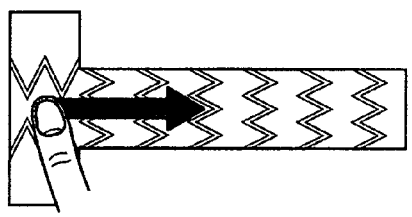

It is noted that FIG. 4B is an example of the operational method of the touch panel 17 in the case where the display position of the cursor K is moved rightward in the screen. Where the user's finger initially touches a sensor other than the sensor 1 and the sensor 3, and continuously touches any sensor twice, the touch panel 17 is operated in the following manner. That is, where the user's finger is moved rightward to another sensor, the cursor K is moved rightward in the menu display, while where the user's finger is moved leftward to another sensor, the cursor K is moved leftward in the menu display. That is, the cursor K is moved in a rightward and leftward direction in the screen.

As explained above, since the sensors 1 and 3 are provided at the leftmost positions among the sensors 1, 2, 3, 4, 5, 6, 7, 8, 9, and the user can perform the inputting operation with the sensors arranged in the lateral direction, the number of the sensors the user can operate when the user performs the inputting operation in the vertical direction and the number of the sensors the user can operate when the user performs the inputting operation in the lateral direction can be generally the same as each other. Thus, even in the inputting operation in the vertical direction, the moving amount of the cursor K (or the moving amount of the finger) equal to the moving amount in the inputting operation in the lateral direction can be secured.

Figure 5:
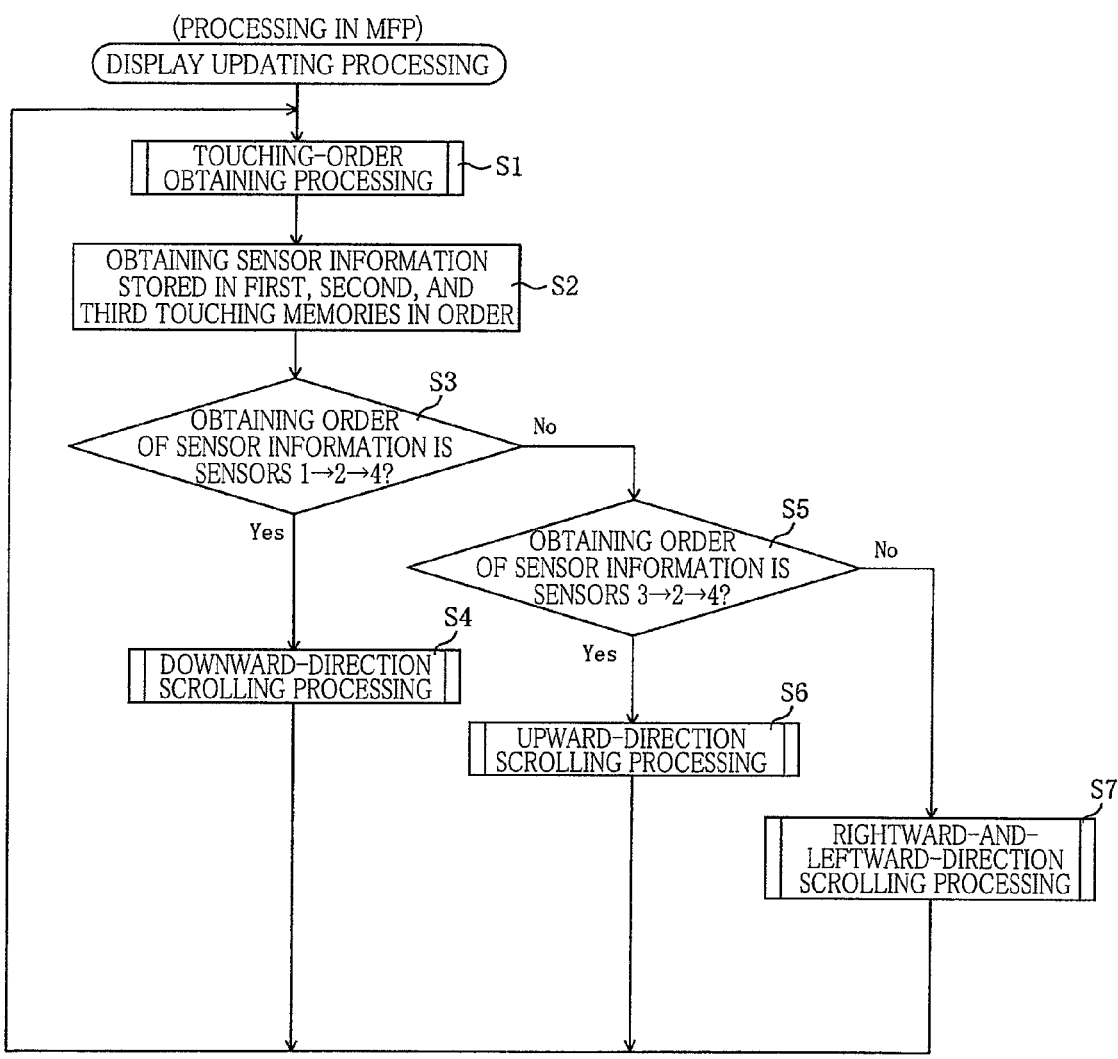
FIG. 5 is a flow-chart showing a display updating processing of the MFP.

There will be next explained the display updating processing performed by the CPU 11 of the MFP 1 with reference to FIG. 5. This display updating processing is a processing for updating the display of the LCD 16 (especially, the display position of the cursor K) in accordance with the moving direction of the user's finger and the moving amount (i.e., the number of the sensor) when the inputting operation is performed with the touch panel 17. The display updating processing is repeatedly performed from turning on a main power of the MFP 1 until the main power is turned off.

In this display updating processing, initially in S1, the CPU performs the touching-order obtaining processing. Where the touching-order obtaining processing is performed, the CPU 11 stores, during the touch the user to the touch panel 17, sensor information of the sensor the user has touched first (e.g., a sensor name, a sensor number, and so on) into the first touching memory 13a of the RAM 13. Likewise, the CPU 11 stores sensor information of the sensor the user has touched second into the second touching memory 13b and stores sensor information of the sensor the user has touched third into the third touching memory 13c.

Next, in S2, the CPU 11 obtains the sensor information stored in the first touching memory 13a, the second touching memory 13b, and the third touching memory 13c in order. Then, the order in which the sensor information is obtained (i.e., the obtaining order of the sensor information) corresponds to the order of the sensors 1→2→4 (S3: Yes), the CPU 11 performs, in S4, the downward-direction scrolling processing in which the cursor K is moved downward in the screen in accordance with the moving amount (the number of the sensors) by which the user's finger is moved rightward. It is noted that the detail of the downward-direction scrolling processing will be explained below with reference to FIG. 7A. Then, the processing returns to S1, and the above-described processings S1-S4 are repeated.

In the case where the obtaining order of the sensor information does not correspond to the order of the sensors 1→2→4 (S3: No), where the obtaining order of the sensor information corresponds to the order of the sensors 3→2→4 (S5: Yes), the CPU 11 performs in S6 the upward-direction scrolling processing in which the cursor K is moved upward in the screen in accordance with the moving amount (the number of the sensors) by which the user's finger is moved rightward. It is noted that the detail of the upward-direction scrolling processing will be explained below with reference to FIG. 7B. Then, the processing returns to S1, and the above-described processings S1-S6 are repeated.

Where the obtaining order of the sensor information does not correspond in S5 to the order of the sensors 3→2→4 (S6: No), the CPU 11 performs in S7 the rightward-and-leftward-direction scrolling processing in which the cursor K is moved leftward or rightward in the screen in accordance with the moving amount (the number of the sensors) by which the user's finger is moved leftward or rightward. It is noted that the detail of the rightward-and-leftward-direction scrolling processing will be explained below with reference to FIG. 7C. Then, the processing returns to S1, and the above-described processings S1-S7 are repeated.

Figure 6:
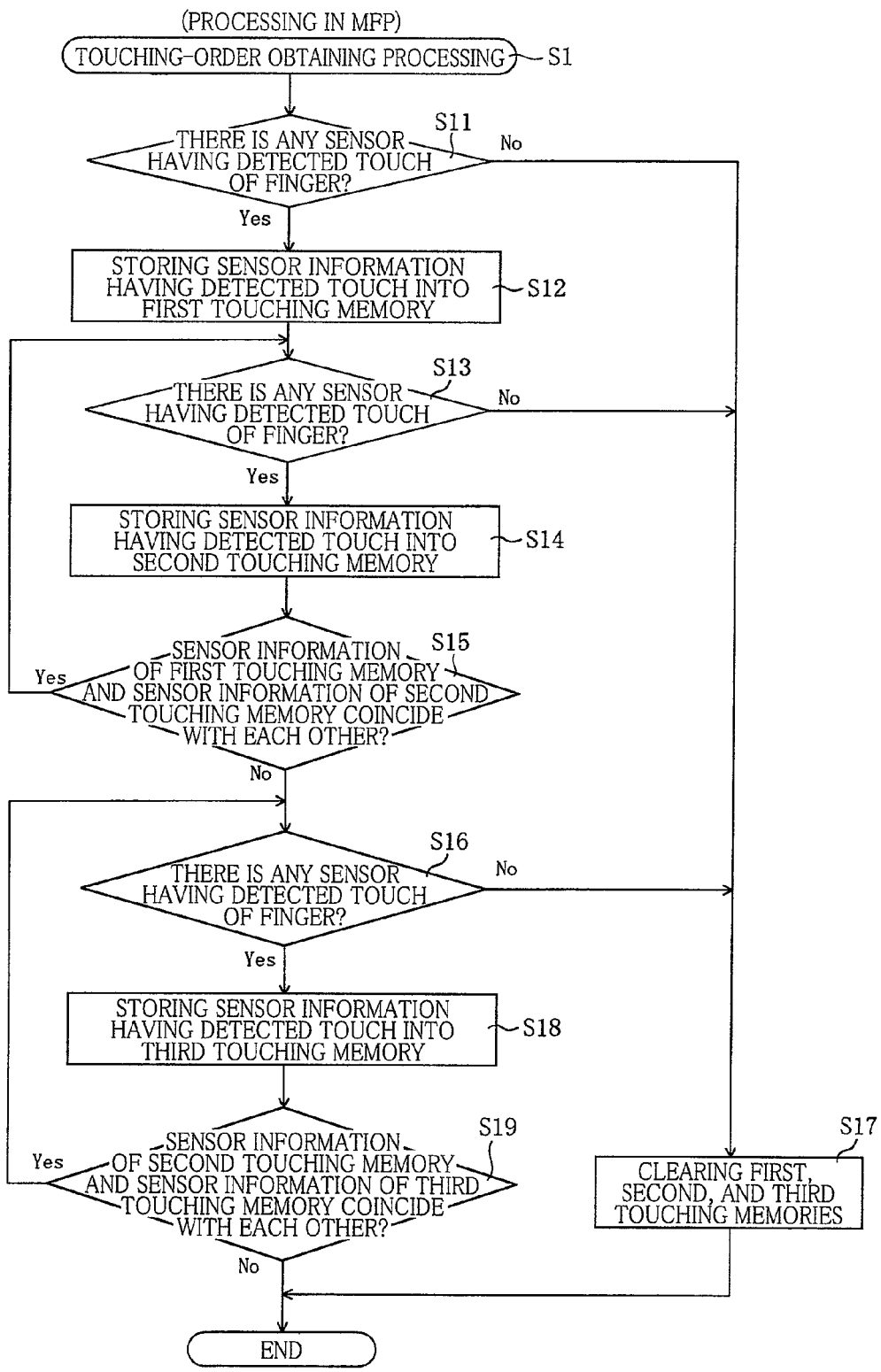
FIG. 6 is a flow-chart showing a touching-order obtaining processing of the MFP.

There will be next explained the touching-order obtaining processing (S1) performed by the CPU 11 of the MFP 1 with reference to FIG. 6.

In the touching-order obtaining processing, initially in S11, the CPU 11 judges whether there is any of the sensors 1-9 which has detected the touch of the finger or not. Where the CPU 11 has judged that there is the sensor having detected the touch of the finger (S11: Yes), the CPU 11 stores in S12 the sensor information indicating the sensor having detected the touch of the finger into the first touching memory 13a of the RAM 13.

Next, in S13, the CPU 11 judges again whether there is any sensor having detected the touch of the finger or not. Where there is the sensor having detected the touch of the finger (S13: Yes), the CPU 11 stores in S14 the sensor information indicating the sensor having detected the touch of the finger into the second touching memory 13b of the RAM 13.

Then, the CPU 11 judges in S15 whether the sensor information of the first touching memory 13a and the sensor information of the second touching memory 13b coincide with each other or not. Where the CPU 11 has judged that the sensor information of the first touching memory 13a and the sensor information of the second touching memory 13b coincide with each other (S15: Yes), the user's finger has not moved to the next sensor yet, and thus the above-described processings S13-S15 are repeated.

On the other hand, where the CPU 11 has judged that the sensor information of the first touching memory 13a and the sensor information of the second touching memory 13b do not coincide with each other (S15: No), the CPU 11 further judges in S16 whether there is any sensor having detected the touch of the finger or not. Where the CPU 11 has judged that there is the sensor having detected the touch of the finger (S16: Yes), the CPU 11 stores in S18 the sensor information indicating the sensor having detected the touch of the finger into the third touching memory 13c of the RAM 13.

Then, the CPU 11 judges in S19 whether the sensor information of the second touching memory 13b and the sensor information of the third touching memory 13c coincide with each other or not. Where the CPU 11 has judged that the sensor information of the second touching memory 13b and the sensor information of the third touching memory 13c coincide with each other (S19: Yes), the user's finger has not moved to the next sensor yet, and thus the above-described processings S16-S19 are repeated.

On the other hand, where the CPU 11 has judged that the sensor information of the second touching memory 13b and the sensor information of the third touching memory 13c do not coincide with each other (S19: No), the order of the first, second, and third sensors has been obtained after the user's finger has touched the touch panel 17, and thus this touching-order obtaining processing is finished.

It is noted that where the CPU 11 has judged that there is no sensor having detected the touch of the finger (S11: No, S13: No, S16: No), the user's finger is moved away or distant from the touch panel 17, and thus the processing goes to S17. In S17, the CPU 11 clears the first touching memory 13a, the second touching memory 13b, and the third touching memory 13c, and finishes the touching-order obtaining processing.

Figure 7A:
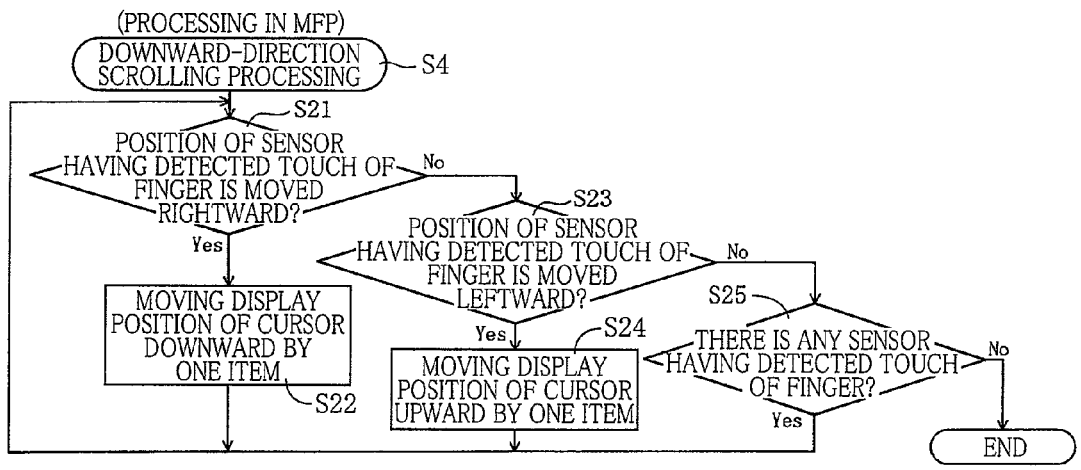
FIG. 7A is a flow-chart showing a downward-direction scrolling processing of the MFP.

There will be next explained the downward-direction scrolling processing (S4) performed by the CPU 11 of the MFP 1 with reference to FIG. 7A.

In the downward-direction scrolling processing, initially in S21, the CPU 11 judges whether a position of any of the sensor 1-9 which has detected the touch of the finger is moved rightward (i.e., toward the sensor 9 with reference to FIG. 1B). That is, the CPU 11 judges whether a state in which the touch of the finger is detected by any sensor is changed to a state in which the touch of the finger is detected by a sensor located on a right side of the sensor previously detecting the touch so as to be adjacent to the sensor or not. Where the CPU 11 has judged that the position is moved rightward (S21: Yes), the CPU 11 moves in S22 the display position of the cursor K downward by one item, and repeats the above-described processings S21-S22. It is noted that where the CPU 11 has judged in S21 that the position of the sensor having detected the touch of the finger is moved rightward by one sensor, the processing goes to S22. For example, where the sensor the user's finger is touching is moved from the sensor 4 to the sensor 5 in the touch panel 17 shown in FIG. 1B, an affirmative decision "YES" is made in S21, and the processing goes to S22. Further, where the sensor the user is touching is moved from the sensor 4 to the sensor 5 and further moved from the sensor 5 to the sensor 6, the affirmative decision "YES" is made in S21 by the movement from the sensor 5 to the sensor 6, and the processing goes to S22. In this case, the cursor is displayed so as to be moved downward by a total of two items.

In the case where the CPU 11 has judged that the position of the sensor having detected the touch of the finger is not moved rightward (S21: No), where the CPU 11 has judged that the position of any of the sensor 1-9 which has detected the touch of the finger is moved leftward (i.e., toward the sensor 2 with reference to FIG. 1B) (S23: Yes), the CPU 11 moves in S24 the display position of the cursor K upward by one item, and repeats the above-described processings of S21-S24.

Where the CPU 11 has judged that the position of the sensor having detected the touch of the finger is not moved leftward (S23: No), the CPU 11 judges in S25 whether there is any of the sensors 1-9 which has detected the touch of the finger. Where the CPU 11 has judged that there is the sensor having detected the touch of the finger (S25: Yes), the user's finger has not been moved to the next sensor yet. Thus, the processing returns to S21, and the above-described processings S21-S25 are repeated.

Where the CPU has judged that there is no sensor having detected the touch of the finger (S25: No), the user's finger is moved away or distant from the touch panel 17, and thus this downward-direction scrolling processing is finished.

Figure 7B:
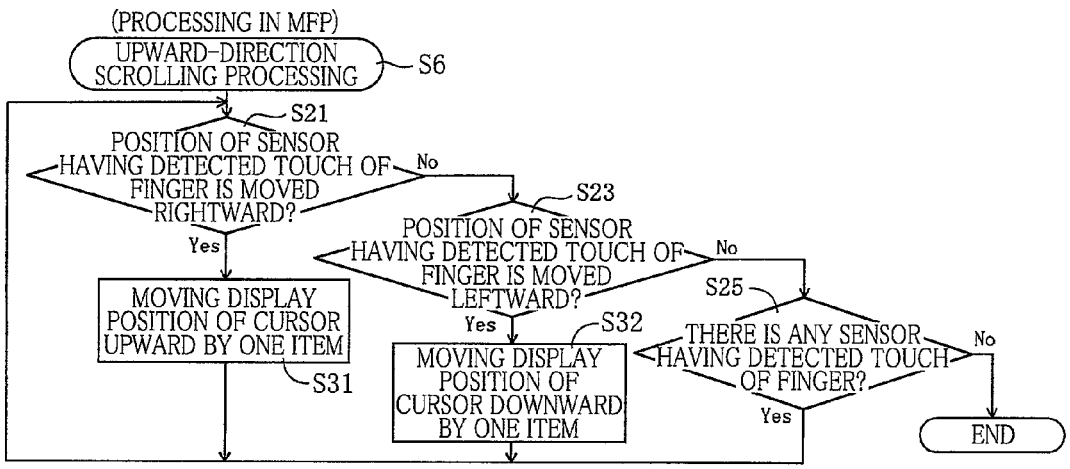
FIG. 7B is a flow-chart showing an upward-direction scrolling processing of the MFP.

There will be next explained the upward-direction scrolling processing (S6) performed by the CPU 11 of the MFP 1 with reference to FIG. 7B. In this upward-direction scrolling processing, the processing of S22 in the above-described downward-direction scrolling processing (with reference to FIG. 7A) is replaced with a processing (i.e., S31 in FIG. 7B) in which the cursor K is moved upward by one item. Further, the above-described processing of S24 is replaced with a processing (i.e., S32 in FIG. 7B) in which the cursor K is moved downward by one item. Thus, an explanation of these processings is dispensed with.

In view of the above, in the first embodiment, the CPU 11 can be considered to include a first judging section which is configured to judge that the movement of the finger is a first-directional movement in which the finger is moved from the detecting start point in the first direction, and that the movement of the finger is a second-directional movement in which the finger is moved in the first direction after being moved in a second direction intersecting the first direction, and which performs the processings of S3 and S5. Further, the CPU 11 can be considered to include a first performing section which is configured to perform a processing according to the movement in the first direction where the first judging section has judged that the movement of the finger is the first-directional movement and which performs the processing of S7. Further, the CPU 11 can be considered to include a second performing section configured to regard the movement in the first direction in the second-directional movement as the movement in the second direction and to perform a processing according to the movement in the second direction, where the first judging section has judged that the movement of the finger is the second-directional movement, and which performs the processings of S4 and S6. Further, the CPU 11 can be considered to include a movement detecting section which is configured to detect the movement in the first direction in the second-directional movement, and which performs the processings of S21 and S23. Further, the CPU 11 can be considered to include a processing performing section which is configured to regard the movement detected by the movement detecting portion as the movement in the second direction and to perform a processing according to the movement in the second direction, and which performs the processings of S22, S24, S31, and S32.

Figure 7C:
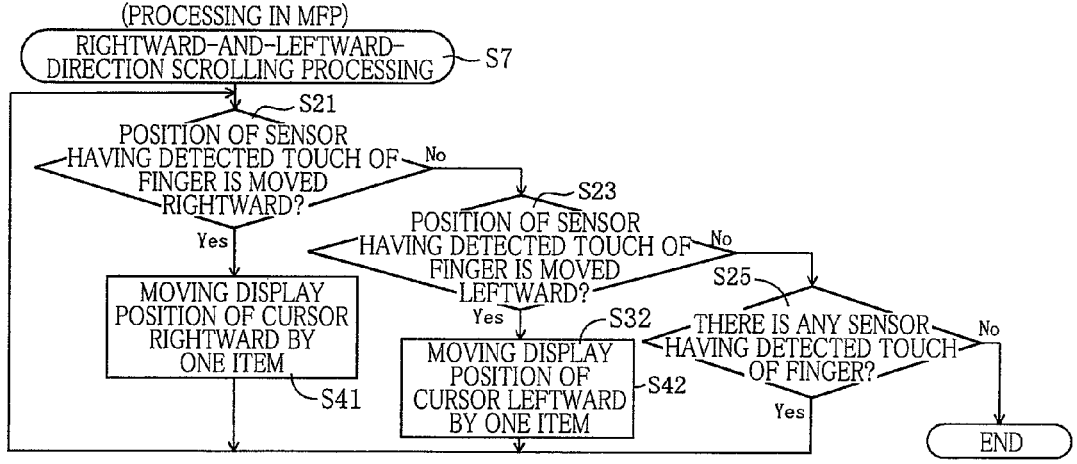
FIG. 7C is a flow-chart showing a rightward-and-leftward-direction scrolling processing of the MFP.

There will be next explained the rightward-and-leftward-direction scrolling processing (S7) performed by the CPU 11 of the MFP 1 with reference to FIG. 7C. In this rightward-and-leftward-direction scrolling processing, the processing of S22 in the above-described downward-direction scrolling processing (with reference to FIG. 7A) is replaced with a processing (i.e., S41 in FIG. 7C) in which the cursor K is moved rightward by one item. Further, the above-described processing of S24 is replaced with a processing (i.e., S42 in FIG. 7B) in which the cursor K is moved leftward by one item. Thus, an explanation of these processings is dispensed with.

There will be next explained an MFP 1 as a second embodiment of the present invention. There will be explained, respectively referring to FIGS. 8A, 8B, and 9, an example of the operational method of the inputting apparatus and another display updating processing of the inputting apparatus. In this second embodiment, the user can instinctively perform the inputting operation in four directions without upsizing the detecting area in the vertical direction.

Figure 8A:
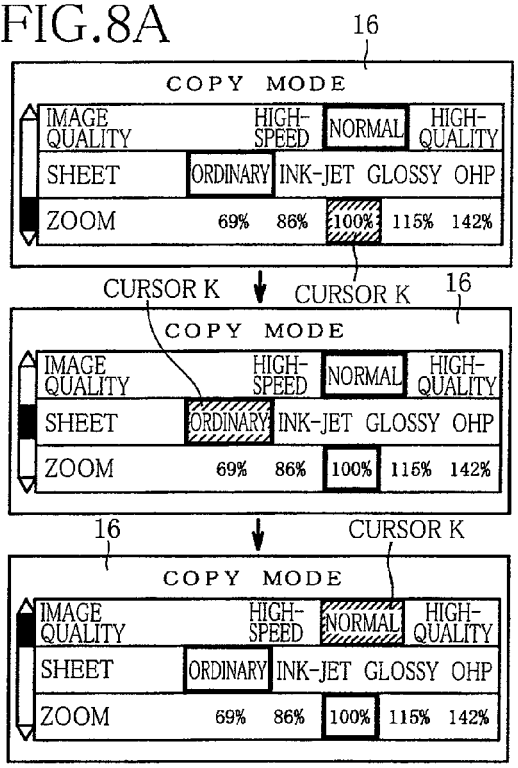
FIGS. 8A and 8B are schematic views each for explaining an example of the operational method of the touch panel.
Figure 8A:
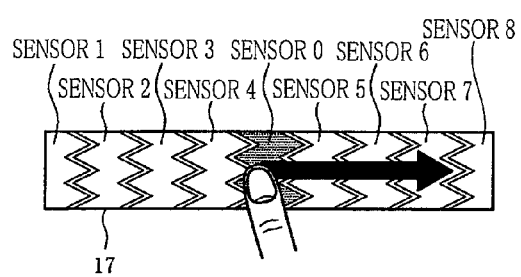
Figure 8B:
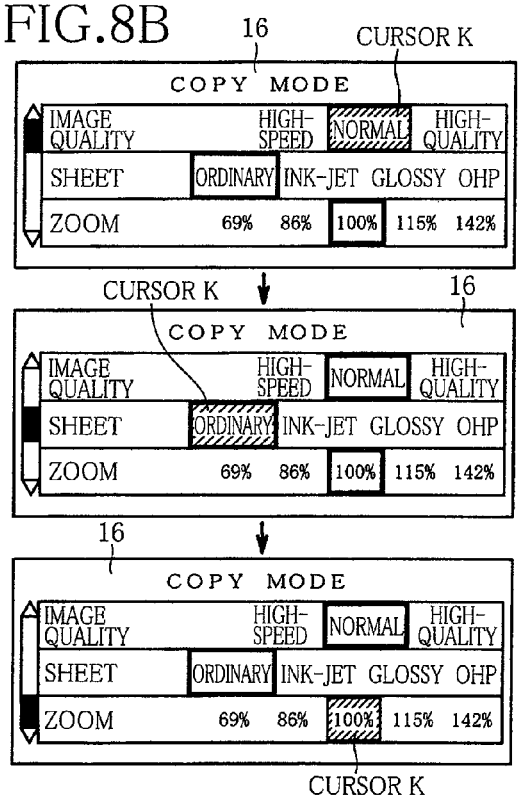
Figure 8B:
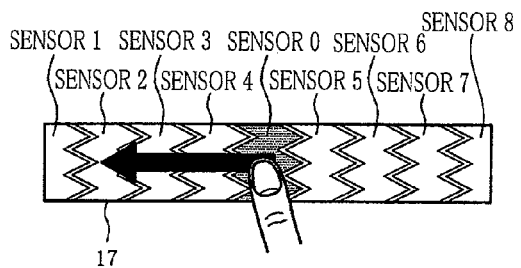

There will be initially explained a configuration of the touch panel 17 in this second embodiment and an example of the operational method with reference to FIGS. 8A and 8B. It is noted that, like the MFP 1 as the first embodiment, this touch panel 17 is provided on a right portion of the LCD 16.

FIG. 8A is a schematic view for explaining an example of the operational method of the touch panel 17 where the display position of the cursor K is moved upward in the screen. FIG. 8B is a schematic view for explaining an example of the operational method of the touch panel 17 where the display position of the cursor K is moved downward in the screen. It is noted that the uppermost LCD 16 in FIG. 8A shows the case in which the user's finger is touching a sensor 0 or 5, a middle LCD 16 in FIG. 8A shows the case in which the user's finger is touching the sensor 6, and the lowermost LCD 16 in FIG. 8A shows the case in which the user's finger is touching the sensor 7. Further, the uppermost LCD 16 in FIG. 8B is the case in which the user's finger is touching the sensor 0 or 4, a middle LCD 16 in FIG. 8B shows the case in which the user's finger is touching the sensor 3, and the lowermost LCD 16 in FIG. 8B shows the case in which the user's finger is touching the sensor 2.

As shown in a right figure of FIG. 8A, the touch panel 17 of the MFP 1 as the second embodiment has a rectangular shape and is separated into nine display areas in each of which whether the finger is being touched or not is detected.

Specifically, there are provided the nine detecting areas in a row so as to be adjacent to each other in the lateral direction from a left end of the touch panel 17 toward a right end thereof. It is noted that these nine detecting areas will be referred to as "a sensor 1, a sensor 2, a sensor 3, a sensor 4, the sensor 0 (an example of a setting area), a sensor 5, a sensor 6, a sensor 7, a sensor 8" in order from the left side toward the right side.

Further, the sensor 0 located at a center of the nine detecting areas has an external view which can be distinguished (i.e., is different) from those of the other sensors 1-8. For example, the sensor 0 may have a surface color different from those of the other sensors 1-8. Further, the sensor 0 may have a mark (e.g., an arrow) placed on or attached to a surface thereof, which mark indicates the upward and downward direction. As a result, the user can distinguish the sensor 0 from the other sensors 1-8 at a glance. It is noted that the other constructions of the MFP 1 as the second embodiment are the same as those of the MFP 1 as the first embodiment, thus the explanation of which is dispensed with.

There will be next explained the operational method of the touch panel 17. There will be initially explained an example of the operational method of the touch panel 17 in the case where the display position of the cursor K is moved upward in the screen. Here, as shown in the menu display of the uppermost one of left figures of FIG. 8A, "100%" is selected by the cursor K in the setting of "ZOOM".

In this state, as shown in the right figure of FIG. 8A, the user's finger initially has touched the sensor 0, and then is moved rightward to touch the sensor 5. Then, where the user's finger is moved rightward to another sensor, the cursor K is moved upward in the menu display (i.e., the cursor K is moved from the uppermost LCD 16 to the medium LCD 16 and then the lowermost LCD 16 in the left figures of FIG. 8A). Then, where the user's finger is moved leftward to another sensor, the cursor K is moved downward in the menu display (i.e., the cursor K is moved from the lowermost LCD 16 to the medium LCD 16 and then the uppermost LCD 16 in the left figures of FIG. 8A). That is, the cursor K is moved in an upward and downward direction in the screen.

That is, where the user wants to move the cursor K upward in the screen, the user only needs to initially touch the sensor 0 and move his or her finger rightward, and continuously input the moving amount. Thus, the user can instinctively perform the input operation. Further, where the user wants to move (return) downward the cursor K being moved upward in the screen, the user only needs to reverse the moving direction of the finger. Thus, the user can instinctively perform the input operation. That is, the user can instinctively perform the input operation in the vertical direction by the sensors arranged in the lateral direction without upsizing the detecting area in the vertical direction.

There will be next explained an example of the operational method of the touch panel 17 in the case where the display position of the cursor K is moved downward in the screen with reference to FIG. 8B. Here, as shown in the menu display in the uppermost LCD 16 of FIG. 8B, "NORMAL" is selected by the cursor K in the setting of "IMAGE QUALITY".

In this state, as shown in the right figure of FIG. 8B, the user's finger has initially touched the sensor 0 and is continuously moved leftward to touch the sensor 4. Then, where the user's finger is moved leftward to another sensor, the cursor K is moved downward in the menu display (i.e., the cursor K is moved from the uppermost LCD 16 to the medium LCD 16 and then the lowermost LCD 16 in the left figures of FIG. 8B). Then, as shown in the right figure of FIG. 8B, where the user's finger is moved rightward to another sensor, the cursor K is moved upward in the menu display (i.e., the cursor K is moved from the lowermost LCD 16 to the medium LCD 16 and then the uppermost LCD 16 in the left figures of FIG. 8B). That is, the cursor K is moved in an upward and downward direction in the screen.

As described above, where the user wants to move the cursor K downward in the screen, the user only needs to initially touch the sensor 0 and move his or her finger leftward, and continuously input the moving amount. Thus, the user can instinctively perform the input operation. Further, where the user wants to move (return) upward the cursor K being moved downward in the screen, the user only needs to reverse the moving direction of the finger. Thus, the user can instinctively perform the input operation. That is, the user can instinctively perform the input operation in the vertical direction by the sensors arranged in the lateral direction without upsizing the detecting area in the vertical direction.

It is noted that, although not shown in any figure, where the cursor K is moved in the rightward and leftward direction in the screen, the user only needs to initially touch any of the sensors other than the sensor 0 and move his or her finger in the rightward and leftward direction.

Further, since the sensor 0 is located at the center of the touch panel 17, the user can input command in two directions, i.e., the upward direction and the downward direction. In addition, the number of the sensors the user can operate in the inputting operation in the upward direction and the number of the sensors the user can operate in the inputting operation in the downward direction can be equal to each other.

It is noted that, in this case, the MFP 1 may be configured such that, where two sensors are being touched or pressed (the finger is being moved to the next sensor), the cursor K in the screen is moved upward or downward by one item in accordance with the moving direction of the finger, for example. Where the MFP 1 is thus configured, the moving amount of the cursor K which is equal to that of the inputting operation in the lateral direction can be secured regardless of the case where the finger is moved rightward from the sensor 0 located at the center of the nine sensors or the case where the finger is moved leftward from the sensor 0.

There will be next explained an electric construction of the MFP 1 as the second embodiment. Since a difference of the electric construction of the MFP 1 as the second embodiment from that of the MFP 1 as the first embodiment (with reference to the block diagram in FIG. 2) is only the ROM 12 and the RAM 13, only the ROM 12 and the RAM 13 will be explained, and an explanation of other elements in the second embodiment which are the same as those in the first embodiment is dispensed with.

The ROM 12, not shown, of the MFP 1 as the second embodiment stores a program for performing a display updating processing indicated by a flow-chart shown in FIG. 9 which will be described below, in addition to the programs for performing the processings in the first embodiment.

The RAM 13, not shown, of the MFP 1 as the second embodiment includes the above-described first touching memory 13a and second touching memory 13b.

Figure 9:
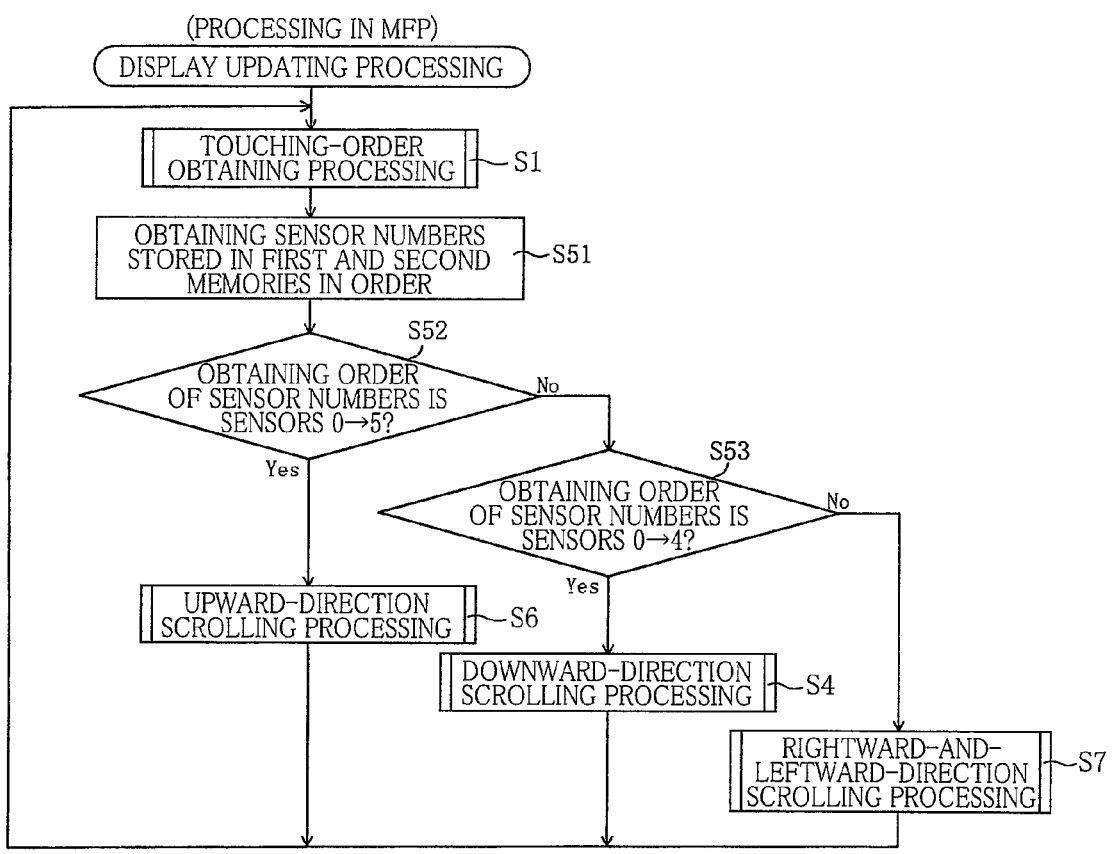
FIG. 9 is a flow-chart showing a display updating processing of an MFP as a second embodiment.

There will be next explained the display updating processing performed by the CPU 11 of the MFP 1 as the second embodiment with reference to FIG. 9.

In this display updating processing, initially in S1, the CPU 11 performs the touching-order obtaining processing. The above-described touching-order obtaining processing (with reference to FIG. 6) is a processing for obtaining, after the user's finger has touched the touch panel 17, the order of the first, second, and third sensors the finger has touched. However, in the second embodiment, the memory storing the sensor the finger has touched third (the third touching memory) is not provided, and thus, in the second embodiment, the MFP 1 is configured such that the CPU 11 obtains the order of the first and second sensors.

Where the touching-order obtaining processing is performed, the CPU 11 stores, during the touch the user to the touch panel 17, the sensor information of the sensor the user has touched first (e.g., the sensor name, the sensor number, and so on) into the first touching memory 13a of the RAM 13. Likewise, the CPU 11 stores the sensor information of the sensor the user has touched second into the second touching memory 13b.

Next, in S51, the CPU 11 obtains the sensor information stored in the first touching memory 13a and the sensor information stored in the second touching memory 13b in order. Then, where the obtaining order of the sensor information corresponds to the order of the sensors 0-45 (S52: Yes), the CPU 11 performs in S6 the upward-direction scrolling processing (with reference to FIG. 7B) in which the CPU 11 moves the cursor K upward in the screen in accordance with the moving amount (the number of the sensors) the user's finger is moved rightward. Then, the processing returns to S1, and the above-described processings S1-S4 are repeated.

On the other hand, in the case where the obtaining order of the sensor information do not correspond to the order of the sensors 0→5 (S52: No), where the obtaining order of the sensor information corresponds to the order of the sensors 0→4 (S53: Yes), the CPU 11 performs in S4 the downward-direction scrolling processing (with reference to FIG. 7A) in which the CPU 11 moves the cursor K downward in the screen in accordance with the moving amount (the number of the sensors) the user's finger is moved leftward. Then, the processing returns to S1, and the above-described processings S1-S6 are repeated.

On the other hand, where the obtaining order of the sensor information do not correspond to the order of the sensors 0→4 (S53: No), the CPU 11 performs in S7 the rightward-and-leftward-direction scrolling processing (with reference to FIG. 7C) in which the CPU 11 moves the cursor K leftward or rightward in the screen in accordance with the moving amount (the number of the sensors) the user's finger is moved leftward or rightward. Then, the processing returns to S1, and the above-described processings S1-S7 are repeated.

In view of the above, in the second embodiment, the CPU 11 can be considered to include a first judging section which is configured to judge, where the detecting portion has detected the movement of the finger from the detecting start point in the first direction, whether the detecting start point is located in the sensor 0 or not, and which performs the processings of S52 and S53. Further, the CPU 11 can be considered to include a first performing section which is configured to perform a processing according to a movement of the finger in the first direction where the first judging section has judged that the detecting start point is not located in the sensor 0, and which performs the processing of S7. Further, the CPU 11 can be considered to include a second performing section which is configured to perform a processing according to a movement of the finger in the second direction by regarding the movement of the finger from the detecting start point in the first direction as the movement in the second direction, where the first judging section has judged that the detecting start point is located in the sensor 0, and which performs the processings of S4 and S6. Further, the CPU 11 can be considered to include a movement detecting section which is configured to detect the movement of the finger from the detecting start point in the first direction, and which performs the processings of S21 and S23. Further, the CPU 11 can be considered to include a processing performing section which is configured to regard the movement detected by the movement detecting portion as the movement in the second direction and to perform a processing according to the movement in the second direction, and which performs the processings of S22, S24, S31, and S32.

While the embodiments of the present invention have been explained above, it is to be understood that the invention is not limited to the details of the illustrated embodiments, but may be embodied with various changes and modifications, which may occur to those skilled in the art, without departing from the spirit and scope of the invention.

For example, in the above-described embodiments, the touch panel 17 is provided at the right portion of the LCD 16, but the MFP 1 may be configured such that the LCD 16 and the touch panel 17 are reversely arranged. Further, the touch panel 17 and the LCD 16 may be arranged in the vertical direction. Further, in the above-described embodiments, the touch panel 17 is disposed so as to have the elongated shape in the rightward and leftward direction, but the MFP 1 may be configured such that the touch panel 17 is disposed by being rotated by 90 degrees so as to have the elongated shape in the upward and downward direction.

Further, in the first embodiment, in the vertical direction in the touch panel 17, one sensor (the sensor 1) is disposed on the upper side of the sensors arranged in the lateral direction (i.e., the sensors 2 and 4-9) while one sensor (the sensor 3) is disposed on the lower side of the sensors, but a plurality of sensors may be disposed on each of the upper and lower sides of the sensors.

Further, in the first embodiment, in the touch panel 17, the sensors (the sensor 1 and the sensor 3) arranged in the vertical direction are disposed on a left end portion of the touch panel 17, the present invention is not limited to this configuration. For example, the sensors (the sensor 1 and the sensor 3) arranged in the vertical direction may be disposed on a right end portion of the touch panel 17 and may be disposed at a center of the touch panel 17.

Further, in the first embodiment, in the touch panel 17, the sensors (the sensor 1 and the sensor 3) arranged in the vertical direction are disposed so as to face to each other with the sensors arranged in the lateral direction (i.e., the sensors 2 and 4-9) interposed therebetween, but the present invention is not limited to this configuration. That is, the sensors (the sensor 1 and the sensor 3) may be disposed on one side of the sensors (i.e., the sensors 2 and 4-9) in the vertical direction. Further, the sensors (the sensor 1 and the sensor 3) may not be disposed so as to face to each other. For example, the MFP 1 may be configured such that the sensor 1 is disposed on the left end portion of the touch panel 17 (i.e., on an upper end of the sensor 2) while the sensor 3 is disposed on the right end portion of the touch panel 17 (i.e., on a lower end of the sensor 9).

Further, in the first embodiment, in the touch panel 17, the sensors (the sensor 1 and the sensor 3) arranged in the vertical direction are disposed on the left end portion of the touch panel 17, but may be disposed at any position of the sensors arranged in the lateral direction (e.g., on the sensor 4 and 5).

Further, in the second embodiment, the sensor 0 is disposed at the center of the touch panel 17, but may be disposed at another position. It is noted that, where the sensor 0 is disposed on one end of the touch panel 17, the sensors 0 are preferably disposed at opposite ends of the touch panel 17 in the lateral direction.

Figure 10A:
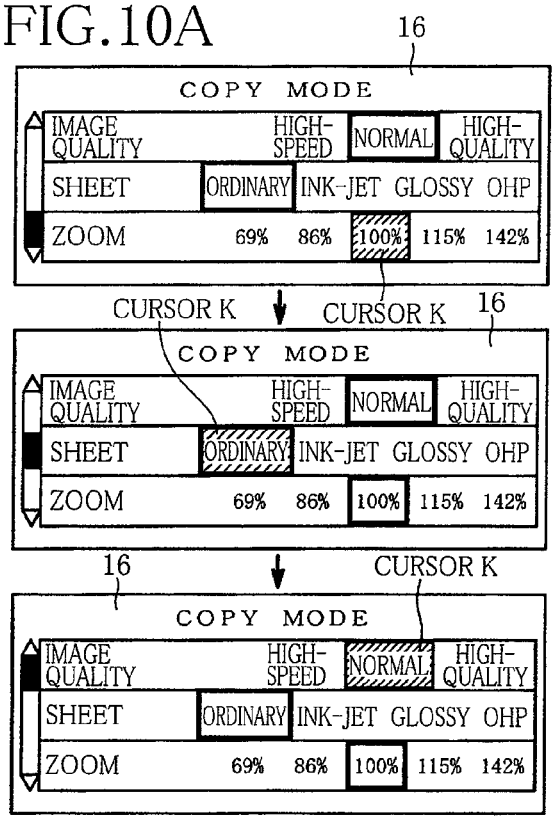
FIGS. 10A and 10B are schematic views each for explaining an example of the operational method of the touch panel.
Figure 10A:
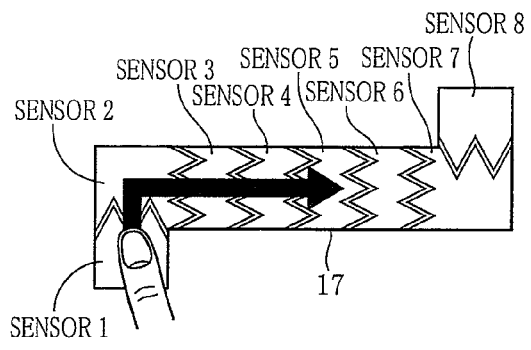
Figure 10B:
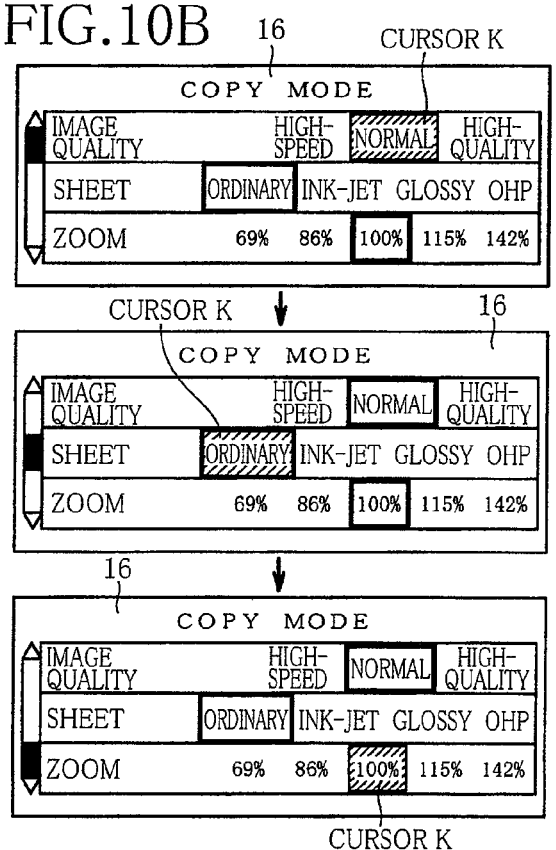
Figure 10B:
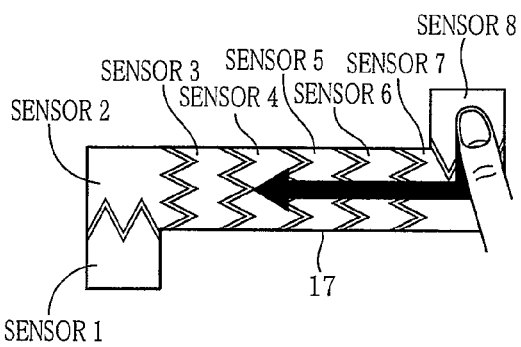

Here, there will be explained a modification of the first embodiment. The touch panel 17 of the MFP 1 as the first embodiment has a shape in which the detecting areas project or extend from the left end portion of the touch panel 17 in the upward and downward direction, but a touch panel 17 as the MFP 1 as the present modification includes, as shown in FIGS. 10A and 10B, (a) a detecting area (i.e., a sensor 1) disposed on a left end portion of the touch panel 17 so as to project or extend downward, and (b) a detecting area (i.e., a sensor 8) disposed on a right end portion of the touch panel 17 so as to project and extend upward. It is noted that the uppermost LCD 16 in FIG. 10A shows the case in which the user's finger is touching the sensor 1, 2, or 3, a middle LCD 16 in FIG. 10A shows the case in which the user's finger is touching the sensor 4, and the lowermost LCD 16 shows the case in which the user's finger is touching the sensor 5. Further, the uppermost LCD 16 in FIG. 10B is the case in which the user's finger is touching the sensor 8, 7, or 6, a middle LCD 16 in FIG. 10B shows the case in which the user's finger is touching the sensor 5, and the lowermost LCD 16 in FIG. 10B shows the case in which the user's finger is touching the sensor 4.

Where the display position of the cursor K is moved upward in the screen, as shown in FIG. 10A, the user only needs to move his or her finger from the sensor 1 to the sensors 2, 3, and 4 in order. Further, where the display position of the cursor K is moved downward in the screen, as shown in FIG. 10B, the user only needs to move his or her finger from the sensor 8 to the sensors 7, 6, and 5 in order. Also in the present modification, like the first embodiment, the user can instinctively perform the input operation. Further, in the present modification, since a direction (the rightward direction) in which the finger is moved in order to move the cursor K upward and a direction (the leftward direction) in which the finger is moved in order to move the cursor K downward are opposite to each other, the moving direction of the finger and the moving direction of the cursor K can be brought into correspondence with each other, whereby the user can perform the input operation more instinctively.

Figure 11A:
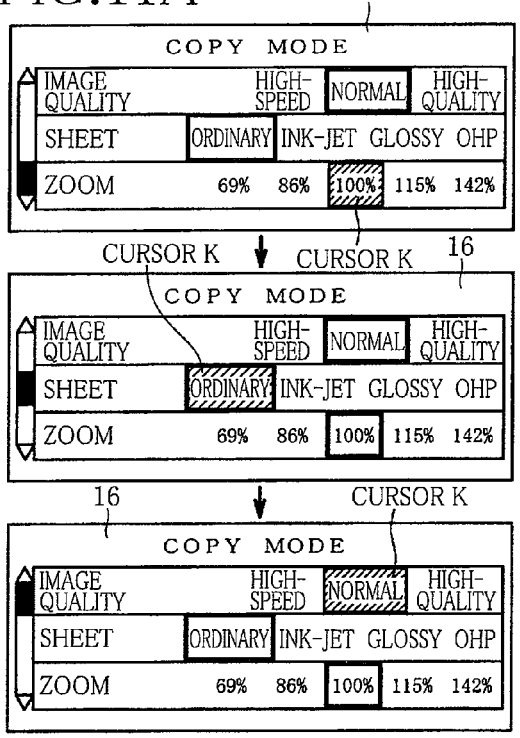
FIGS. 11A and 11B are schematic views each for explaining an example of the operational method of the touch panel.
Figure 11A:
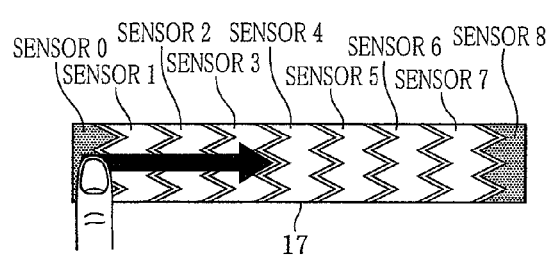
Figure 11B:
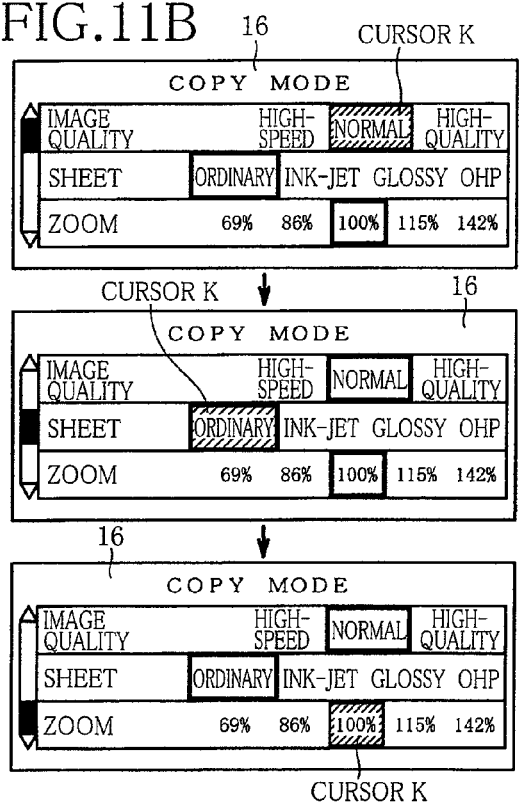
Figure 11B:
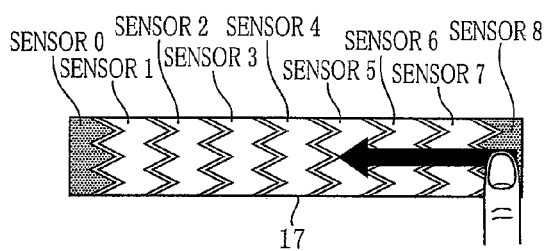

Further, here, there will be explained a modification of the second embodiment. The touch panel 17 of the MFP 1 as the second embodiment has a configuration in which the sensor 0 as the setting area is disposed at the center of the touch panel 17 in the longitudinal direction thereof, but a touch panel 17 of the MFP 1 as the present modification includes, as shown in FIGS. 11A and 11B, setting areas respectively disposed on left and right end portions of the touch panel 17. It is noted that the uppermost LCD 16 in FIG. 11A shows the case in which the user's finger is touching the sensor 0 or 1, a middle LCD 16 in FIG. 11A shows the case in which the user's finger is touching the sensor 2, and the lowermost LCD 16 in FIG. 11A shows the case in which the user's finger is touching the sensor 3. Further, the uppermost LCD 16 in FIG. 11B is the case in which the user's finger is touching the sensor 8 or 7, a middle LCD 16 in FIG. 11B shows the case in which the user's finger is touching the sensor 6, and the lowermost LCD 16 in FIG. 11B shows the case in which the user's finger is touching the sensor 5.

Where the display position of the cursor K is moved upward in the screen, as shown in FIG. 11A, the user only needs to move his or her finger from the sensor 0 to the sensors 1 and 2 in order. Further, where the display position of the cursor K is moved downward in the screen, as shown in FIG. 11B, the user only needs to move his or her finger from the sensor 8 to the sensors 7 and 6 in order. Also in the present modification, like the second embodiment, the user can instinctively perform the input operation. Further, in the present modification, since a direction (the rightward direction) in which the finger is moved in order to move the cursor K upward and a direction (the leftward direction) in which the finger is moved in order to move the cursor K downward are opposite to each other, the moving direction of the finger and the moving direction of the cursor K can be brought into correspondence with each other, whereby the user can perform the input operation more instinctively.

It is noted that, in the above-described first embodiment, the CPU 11 detects the sensor the user's finger has touched the touch panel 17 first and the sensor the finger has touched the touch panel 17 at the next time, and specifies the direction of the scrolling of the cursor K by the moving direction from a position at which the user's finger has touched the touch panel 17 first, but the present invention is not limited to this configuration. For example, where the user's finger moves, after having touched the touch panel 17 first, in a third direction (e.g., 45 degrees direction) which does not coincide with the upward and downward direction or the rightward and leftward direction, then in the upward direction, and finally in the leftward direction, the CPU 11 may specify the scrolling direction of the cursor K as the upward direction. That is, where the user's finger has moved in one of the upward direction and the downward direction by the time when the finger is moved one of the rightward direction and the leftward direction after having touched the touch panel 17 first, the scrolling direction of the cursor K can be determined on the basis of the movement of the finger in one of the upward direction and the downward direction. As a result, the position at which the user's finger has touched the touch panel 17 first is not limited to a specific position, thereby improving usability of the MFP 1 more.

What is claimed is:
1. An inputting apparatus comprising:
 a detecting portion configured to detect a movement of an input object relative to a detecting area;
 a first judging section configured to judge that the movement of the input object which is detected by the detecting portion is a first-directional movement in which the input object is moved from a detecting start point in a first direction, and that the movement of the input object is a second-directional movement in which the input object is moved in the first direction after being moved in a second direction intersecting the first direction;
 a first performing section configured to perform a processing according to the movement in the first direction where the first judging section has judged that the movement of the input object is the first-directional movement;
a second performing section configured to regard the movement in the first direction in the second-directional movement as the movement in the second direction and to perform a processing according to the movement in the second direction, where the first judging section has judged that the movement of the input object is the second-directional movement; and
a displaying portion configured to display a plurality of items and an item specifying portion which displays a specified one of the plurality of items in a manner different from a manner in which the other of the plurality of items is displayed,
wherein the item specifying portion is configured to be moved in accordance with the movement of the input object which is detected by the detecting portion,
wherein the first performing section is configured to move the item specifying portion in the first direction on the basis of the movement of the input object in the first direction and display the moved item specifying portion on the displaying portion,
wherein the second performing section is configured to move the item specifying portion in the second direction or an opposite second direction opposite to the second direction on the basis of the movement of the input object in the first direction and display the moved item specifying portion on the displaying portion,
wherein the first performing section is configured to move the item specifying portion in the first direction by a moving amount corresponding to a moving amount of the input object in the first direction and display the moved item specifying portion on the displaying portion,
wherein the second performing section is configured to move the item specifying portion in the second direction by the moving amount corresponding to the moving amount of the input object in the first direction and display the moved item specifying portion on the displaying portion,
wherein the detecting area includes a plurality of first-directional detecting areas arranged in the first direction and each configured to detect a position of the input object in the first direction,
wherein a plurality of the items are disposed in each of the first direction and the second direction,
wherein the first performing section is configured to move the item specifying portion in the first direction by one or ones of the plurality of items whose number is the same as that of one or ones of the plurality of first-directional detecting areas by which the input object has been moved in the first direction and display the moved item specifying portion on the displaying portion, and
wherein the second performing section is configured to move the item specifying portion in the second direction by one or ones of the plurality of items whose number is the same as that of one or ones of the plurality of first-directional detecting areas by which the input object has been moved in the first direction and display the moved item specifying portion on the displaying portion.

2. The inputting apparatus according to claim 1, wherein the second performing section includes:
a movement detecting section configured to detect the movement in the first direction in the second-directional movement; and
a processing performing section configured to regard the movement detected by the movement detecting section as the movement in the second direction and to perform a processing according to the movement in the second direction.

3. The inputting apparatus according to claim 1, further comprising a second judging section configured to judge that the movement of the input object which is detected by the detecting portion is an opposite first-directional movement in which the input object is moved in an opposite first direction opposite to the first direction after being moved in the first direction,
wherein the first performing section is configured to perform a processing according to the movement in the opposite first direction where the second judging section has judged that the movement of the input object is the opposite first-directional movement, and
wherein the second performing section is configured to perform a processing according to a movement in an opposite second direction opposite to the second direction by regarding the movement in the opposite first direction in the opposite first-directional movement as the movement in the opposite second direction, where the second judging section has judged that the movement of the input object is the opposite first-directional movement.

4. The inputting apparatus according to claim 1,
wherein the first judging section is configured to judge that the movement of the input object which is detected by the detecting portion is an opposite second directional movement in which the input object is moved in the first direction after being moved in an opposite second direction opposite to the second direction, and
wherein the second performing section is configured to perform a processing according to the movement in the opposite second direction by regarding the movement in the first direction in the opposite second directional movement as the movement in the opposite second direction, where the first judging section has judged that the movement of the input object is the opposite second directional movement.

5. The inputting apparatus according to claim 1,
wherein the detecting area includes:
a first detecting area formed to have a generally rectangular shape, with the first direction being as a longitudinal direction of the first detecting area; and
a second detecting area formed to extend from a part of a longitudinal edge of the first detecting area by a distance shorter than a length of the first detecting area in the longitudinal direction thereof.

6. The inputting apparatus according to claim 5,
wherein the second detecting area is disposed near one of opposite ends of the first detecting area in the longitudinal direction thereof.

7. The inputting apparatus according to claim 1,
wherein the first performing section is configured to move the item specifying portion in the opposite first direction on the basis of the movement of the input object in the opposite first direction and display the moved item specifying portion on the displaying portion, and
wherein the second performing section is configured to move the item specifying portion in the opposite second direction or the second direction on the basis of the movement of the input object in the opposite first direction and display the moved item specifying portion on the displaying portion.

8. An inputting apparatus comprising:
a detecting portion configured to detect a movement of an input object relative to a detecting area;
a first judging section configured to judge that the movement of the input object which is detected by the detecting portion is a first-directional movement in which the input object is moved from a detecting start point in a first direction, and that the movement of the input object is a second-directional movement in which the input object is moved in the first direction after being moved in a second direction intersecting the first direction;
a first performing section configured to perform a processing according to the movement in the first direction where the first judging section has judged that the movement of the input object is the first-directional movement; and
a second performing section configured to regard the movement in the first direction in the second-directional movement as the movement in the second direction and to perform a processing according to the movement in the second direction, where the first judging section has judged that the movement of the input object is the second-directional movement,
wherein the detecting area includes:
a first detecting area formed to have a generally rectangular shape, with the first direction being as a longitudinal direction of the first detecting area; and
a second detecting area formed to extend from a part of a longitudinal edge of the first detecting area by a distance shorter than a length of the first detecting area in the longitudinal direction thereof,
wherein a direction from one to the other of opposite ends of the first detecting area in the longitudinal direction thereof is defined as the first direction,
wherein a direction from one to the other of a pair of longitudinal edges of the first detecting area is defined as the second direction, while a direction from the other to the one of the pair of longitudinal edges of the first detecting area is defined as an opposite second direction opposite to the second direction,
wherein the second detecting area is disposed near one of opposite ends of the first detecting area in the longitudinal direction thereof so as to extend from each of the one and the other of the pair of longitudinal edges,
wherein the first judging section is configured to judge that the movement of the input object which is detected by the detecting portion is the second-directional movement in which the input object is moved in the first direction after being moved in the second direction, and that the movement of the input object is an opposite second directional movement in which the input object is moved in the first direction after being moved in the opposite second direction, and
wherein the second performing section is configured to perform a processing according to the movement in the second direction by regarding the movement in the first direction in the second-directional movement as the movement in the second direction, where the first judging section has judged that the movement of the input object is the second-directional movement, and configured to perform a processing according to the movement in the opposite second direction by regarding the movement in the first direction in the opposite second directional movement as the movement in the opposite second direction, where the first judging section has judged that the movement of the input object is the opposite second directional movement.

9. An inputting apparatus comprising:
a detecting portion configured to detect a movement of an input object relative to a detecting area;
a first judging section configured to judge that the movement of the input object which is detected by the detecting portion is a first-directional movement in which the input object is moved from a detecting start point in a first direction, and that the movement of the input object is a second-directional movement in which the input object is moved in the first direction after being moved in a second direction intersecting the first direction;
a first performing section configured to perform a processing according to the movement in the first direction where the first judging section has judged that the movement of the input object is the first-directional movement; and
a second performing section configured to regard the movement in the first direction in the second-directional movement as the movement in the second direction and to perform a processing according to the movement in the second direction, where the first judging section has judged that the movement of the input object is the second-directional movement,
wherein the detecting area includes:
a first detecting area formed to have a generally rectangular shape, with the first direction being as a longitudinal direction of the first detecting area; and
a second detecting area formed to extend from a part of a longitudinal edge of the first detecting area by a distance shorter than a length of the first detecting area in the longitudinal direction thereof,
wherein a direction from one to the other of opposite ends of the first detecting area in the longitudinal direction thereof is defined as the first direction, while a direction from the other to the one of the opposite ends of the first detecting area in the longitudinal direction thereof is defined as an opposite first direction opposite to the first direction,
wherein a direction from one to the other of a pair of longitudinal edges of the first detecting area is defined as the second direction, while a direction from the other to the one of the pair of longitudinal edges of the first detecting area is defined as an opposite second direction opposite to the second direction,
wherein the second detecting area is disposed near each of (a) one of opposite ends of the first detecting area in the longitudinal direction thereof so as to extend from the one of the pair of longitudinal edges and (b) the other of the opposite ends of the first detecting area in the longitudinal direction thereof so as to extend from the other of the pair of longitudinal edges,
wherein the first judging section is configured to judge that the input object detected by the detecting portion has been moved in the first direction after being moved in the second direction and that the input object has been moved in the opposite first direction after being moved in the opposite second direction, and
wherein the second performing section is configured to perform a processing according to the movement in the second direction by regarding the movement in the first direction as the movement in the second direction, where the first judging section has judged that the input object has been moved in the first direction after being moved in the second direction, and configured to perform a processing according to the movement in the opposite second direction by regarding the movement in the opposite first direction as the movement of the opposite second direction, where the first judging section has judged that the input object has been moved in the opposite first direction after being moved in the opposite second direction.

10. An inputting apparatus comprising:
a detecting portion configured to detect a movement of an input object relative to a detecting area having a generally rectangular shape, with a first direction being as a longitudinal direction of the detecting area;
a first judging section configured to judge, where the detecting portion has detected the movement of the input object from a detecting start point in the first direction, whether the detecting start point is located in a setting area which is preset in the detecting area or not;
a first performing section configured to perform a processing according to a movement of the input object in the first direction where the first judging section has judged that the detecting start point is not located in the setting area;
a second performing section configured to perform a processing according to a movement of the input object in a second direction intersecting the first direction by regarding the movement of the input object from the detecting start point in the first direction as the movement in the second direction, where the first judging section has judged that the detecting start point is located in the setting area; and
a displaying portion configured to display a plurality of items and an item specifying portion which displays a specified one of the plurality of items in a manner different from a manner in which the other of the plurality of items is displayed,
wherein the item specifying portion is configured to be moved in accordance with the movement of the input object which is detected by the detecting portion,
wherein the first performing section is configured to move the item specifying portion in the first direction on the basis of the movement of the input object in the first direction and display the moved item specifying portion on the displaying portion,
wherein the second performing section is configured to move the item specifying portion in the second direction or an opposite second direction opposite to the second direction on the basis of the movement of the input object in the first direction and display the moved item specifying portion on the displaying portion,
wherein the first performing section is configured to move the item specifying portion in the first direction by a moving amount corresponding to a moving amount of the input object in the first direction and display the moved item specifying portion on the displaying portion,
wherein the second performing section is configured to move the item specifying portion in the second direction by the moving amount corresponding to the moving amount of the input object in the first direction and display the moved item specifying portion on the displaying portion,
wherein the detecting area includes a plurality of first-directional detecting areas arranged in the first direction and each configured to detect a position of the input object in the first direction,
wherein a plurality of the items are disposed in each of the first direction and the second direction,
wherein the first performing section is configured to move the item specifying portion in the first direction by one or ones of the plurality of items whose number is the same as that of one or ones of the plurality of first-directional detecting areas by which the input object has been moved in the first direction and display the moved item specifying portion on the displaying portion, and
wherein the second performing section is configured to move the item specifying portion in the second direction by one or ones of the plurality of items whose number is the same as that of one or ones of the plurality of first-directional detecting areas by which the input object has been moved in the first direction and display the moved item specifying portion on the displaying portion.

11. The inputting apparatus according to claim 10, further comprising a second judging section configured to judge whether the input object has been moved in an opposite first direction opposite to the first direction after being moved in the first direction or not,
wherein the first performing section is configured to perform a processing according to the movement in the opposite first direction where the second judging section has judged that the input object has been moved in the opposite first direction, and
wherein the second performing section is configured to perform a processing according to a movement of the input object in an opposite second direction opposite to the second direction by regarding to the movement in the opposite first direction as the movement in the opposite second direction, where the second judging section has judged that the input object has been moved in the opposite first direction.

12. The inputting apparatus according to claim 10,
wherein the setting area is set at a generally central portion of the detecting area in the longitudinal direction thereof.

13. The inputting apparatus according to claim 10,
wherein the setting area is set at each of opposite end portions of the detecting area in the longitudinal direction thereof,
wherein a direction from one to the other of opposite ends of the detecting area in the longitudinal direction thereof is defined as the first direction, while a direction from the other to the one of the opposite ends of the detecting area in the longitudinal direction thereof is defined as an opposite first direction opposite to the first direction,
where the first performing section is configured to perform a processing according to a movement in the opposite first direction where the first judging section has judged that the detecting start point is not located in the setting area and where the input object has been moved from the detecting start point in the opposite first direction, and
wherein the second performing section is configured to perform a processing according to a movement in an opposite second direction opposite to the second direction by regarding the movement from the detecting start point in the opposite first direction as the movement in the opposite second direction, where the first judging section has judged that the detecting start point is located in the setting area and where the input object has been moved from the detecting start point in the opposite first direction.

14. The inputting apparatus according to claim 10,
wherein the setting area is configured to have an external view that is distinguishable from that of a portion of the detecting area which is different from the setting area.

15. The inputting apparatus according to claim 10,
wherein the first performing section is configured to move the item specifying portion in the opposite first direction on the basis of the movement of the input object in the opposite first direction and display the moved item specifying portion on the displaying portion, and wherein the second performing section is configured to move the item specifying portion in the opposite second direction or the second direction on the basis of the movement of the input object in the opposite first direction and display the moved item specifying portion on the displaying portion.

16. An inputting apparatus comprising:

a detecting portion configured to detect a movement of an input object relative to a detecting area having a generally rectangular shape, with a first direction being as a longitudinal direction of the detecting area;

a first judging section configured to judge, where the detecting portion has detected the movement of the input object from a detecting start point in the first direction, whether the detecting start point is located in a setting area which is preset in the detecting area or not;

a first performing section configured to perform a processing according to a movement of the input object in the first direction where the first judging section has judged that the detecting start point is not located in the setting area;

a second performing section configured to perform a processing according to a movement of the input object in a second direction intersecting the first direction by regarding the movement of the input object from the detecting start point in the first direction as the movement in the second direction, where the first judging section has judged that the detecting start point is located in the setting area, wherein the setting area is set at a portion of the detecting area which is different from opposite ends of the detecting area in the longitudinal direction thereof, wherein one of opposite directions from the setting area along the detecting area is defined as the first direction, while the other of the opposite directions from the setting area along the detecting area is defined as an opposite first direction opposite to the first direction, wherein the first performing section is configured to perform a processing according to a movement of the input object in the opposite first direction where the first judging section has judged that the detecting start point is not located in the setting area and where the input object has been moved from the detecting start point in the opposite first direction, and wherein the second performing section is configured to perform a processing according to a movement of the input object in an opposite second direction opposite to the second direction by regarding the movement from the detecting start point in the opposite first direction as the movement in the opposite second direction, where the first judging section has judged that the detecting start point is located in the setting area and where the input object has been moved from the detecting start point in the opposite first direction.

* * * * *